US009060660B2

(12) United States Patent
Tyler

(10) Patent No.: US 9,060,660 B2
(45) Date of Patent: Jun. 23, 2015

(54) VACUUM CLEANER COMPRISING A DUST-BAG-HOUSING MADE OF PAPER

(75) Inventor: Jake Tyler, Borrowash (GB)

(73) Assignee: Techtronic Floor Care Technology Limited, Tortola (VG)

( * ) Notice: Subject to any disclaimer, the term of this patent is extended or adjusted under 35 U.S.C. 154(b) by 7 days.

(21) Appl. No.: 14/125,782

(22) PCT Filed: Jun. 12, 2012

(86) PCT No.: PCT/IB2012/052952
§ 371 (c)(1),
(2), (4) Date: Jan. 18, 2014

(87) PCT Pub. No.: WO2012/172478
PCT Pub. Date: Dec. 20, 2012

(65) Prior Publication Data
US 2014/0173848 A1 Jun. 26, 2014

(51) Int. Cl.
*A47L 9/14* (2006.01)
*A47L 9/00* (2006.01)
(52) U.S. Cl.
CPC .............. *A47L 9/1418* (2013.01); *A47L 9/00* (2013.01); *A47L 9/0081* (2013.01); *A47L 9/009* (2013.01)

(58) Field of Classification Search
CPC .... A47L 9/0081; A47L 9/1418; A47L 9/0063
USPC ............. 15/347, 323, 350–353, 327.1, 327.2, 15/327.7
See application file for complete search history.

(56) References Cited

U.S. PATENT DOCUMENTS

| 3,492,016 A | 1/1970 | O'Connor et al. |
| 6,170,118 B1 * | 1/2001 | McIntyre et al. ............ 15/327.6 |
| 2011/0119859 A1 | 5/2011 | Frei |

FOREIGN PATENT DOCUMENTS

| EP | 1262135 A2 | 12/2002 |
| WO | 9919703 A2 | 4/1999 |
| WO | 2008146070 A1 | 12/2008 |

OTHER PUBLICATIONS

International Search Report for Application No. PCT/IB2012/052952 dated Sep. 17, 2012 (10 pages).

* cited by examiner

*Primary Examiner* — Dung Van Nguyen
(74) *Attorney, Agent, or Firm* — Michael Best & Friedrich LLP

(57) ABSTRACT

A vacuum cleaner comprising a dust-bag-housing 104 made of paper, preferably card board housing panels 104*a*. Thus, the vacuum cleaner is environmentally friendly, having recyclable parts in place of some typical plastic parts, and is also capable of muffling the noise of vacuum generation.

18 Claims, 20 Drawing Sheets

VACUUM CLEANER COMPRISING A DUST-BAG-HOUSING MADE OF PAPER

FIELD OF THE TECHNOLOGY

The invention generally relates to the field of vacuum cleaners.

BACKGROUND OF THE INVENTION

Vacuum cleaners typically comprise a housing to which a hose is attached for directing suction. The housing is designed to contain both a motor and a dust bag for collecting rubbish sucked into the housing. Naturally, the housing has an outlet for dispelling the air sucked into the vacuum cleaner, and another outlet for a cable to power supply.

There are disadvantages with vacuum cleaners that are so pervasive that people generally assume these problems are necessary evils. For example, people tend to accept that vacuum cleaners are essentially noisy devices. Thus, no one has been able to mitigate this annoyance very successfully so far.

To reduce the weight of vacuum cleaners, the housing is typically made of injection-moldable plastic. However, use of plastic is environmentally unfriendly. Moreover, the plastic housing adds to the resonance of the housing, which magnifies the vacuum cleaner noise.

Therefore, it is desirable to propose suitable improvements for reducing these disadvantages.

SUMMARY OF INVENTION

In the first aspect, the invention proposes a vacuum cleaner comprising a dust-bag-housing made of paper. Advantageously, being made of paper gives the bag housing several advantageous qualities, including material re-cycle-ability and bio-degradability. Furthermore, the use of paper provides good sound absorption which reduces the noise from the vacuum motor.

Preferably, the dust-bag-housing is made of a plurality of housing panels made of paper, wherein the housing panels define a chamber in the dust-bag-housing for containing a dust bag. Typically, the housing panels are placed in face-wise contact, such that the edges of the housing panels define the chamber. In this way, structural strength face-wise is provided by the layers of housing panels being in contact, while structural strength edgewise of the housing panels is provided by the depth of each housing panel.

Preferably, the vacuum cleaner further comprises a motor housing, wherein the dust-bag-housing is secured to the motor housing such that a vacuum motor in the motor housing is capable of drawing air from the chamber in the dust-bag-housing. Moreover, the motor housing segregates the electrical parts of the vacuum cleaner from the dust-bag-housing. Advantageously, the movement of airflow is continuous from the dust-bag-housing into the motor housing while the electricals parts of the vacuum cleaner are contained only within the motor housing. This allows the dust-bag-housing to be manufactured separately from the motor housing, even by different manufacturers, reducing the cost of manufacture and also giving great flexibility in the selection of different parts manufacturers.

Preferably, the vacuum cleaner further comprises an overlaying panel overlaying on the edges of the housing panels, and secured to the housing panels. This provides a cross-paneling structure which holds the housing panels together, which is advantageous for structural strength. More preferably, the overlaying panel forms a cover over the chamber, which is capable of being held in a closed position over the chamber by magnetic devices.

Optionally, wheels at least partly made of paper are provided to allow the vacuum cleaner to be wheeled. This further enhances the eco-friendliness of the vacuum cleaner.

In a second aspect, the invention proposes user-assembly kit for assembling a vacuum cleaner, comprising: a plurality of housing panels, a motor housing containing a vacuum motor, an overlaying panel, wherein the plurality of housing panels being capable of being placed in face-wise contact to form a dust-bag-housing, such that the edges of the housing panels define a chamber in the dust-bag-housing for containing a dust bag, the dust-bag-housing capable of being secured to the motor housing such that the vacuum motor is capable of drawing in air from within the dust-bag-housing, the motor housing segregating electrical parts of the vacuum cleaner from the dust-bag-housing, the overlaying panel capable of being overlaid on the edges of the housing panels and to be secured to the outermost of the housing panels to hold the housing panels forming the dust-bag-housing together.

The advantage of such a user-assembled vacuum cleaners reduces the cost of manpower in the factory and faster production. Moreover, the self-assembly kit has greater consumer attractiveness in the DIY (Do-It-Yourself) market. Furthermore, the assembly kit is useful as an educational tool for children on product construction.

Preferably, the shapes of the housing panels are provided in a downloadable software document to allow a user to cut out the housing panels himself. This further reduces the need to provide pre-stamped or pre-cut housing panels to the user, and also reduces production and transport costs, since the motor housing may be the only part which needs to be bought by the user.

In a third aspect, the invention proposes a sound-muffled vacuum cleaner comprising: a dust-bag-housing made of paper, such the dust-bag-housing is capable of absorbing noise generated when the vacuum cleaner is in operation. Use of paper is superior to using rubber or other polymer such as polyurethane as a noise absorption material. Other than ecological friendly reasons, paper allows the design of the dust-bag-housing to be varied and improved for sound absorption easily, as a polymer mold need not be engineered.

In a fourth aspect, the invention proposes a dust-bag-housing for a vacuum cleaner, wherein the dust-bag-housing is made of paper. The dust-bag-housing may be manufactured and sold separately, allowing other manufacturers to provide the motor housing separately and independently.

In a fifth aspect, the invention proposes a motor housing for a vacuum cleaner, wherein the motor housing contains electrical parts required for the operation of the vacuum cleaner to segregate the electrical parts from a dust-bag-housing of the vacuum cleaner. The motor housing may be manufactured and sold separately, allowing other manufacturers to provide the dust-bag-housing separately and independently.

BRIEF DESCRIPTION OF THE FIGURES

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

SPECIFIC DESCRIPTION OF EMBODIMENT

Figure 1:
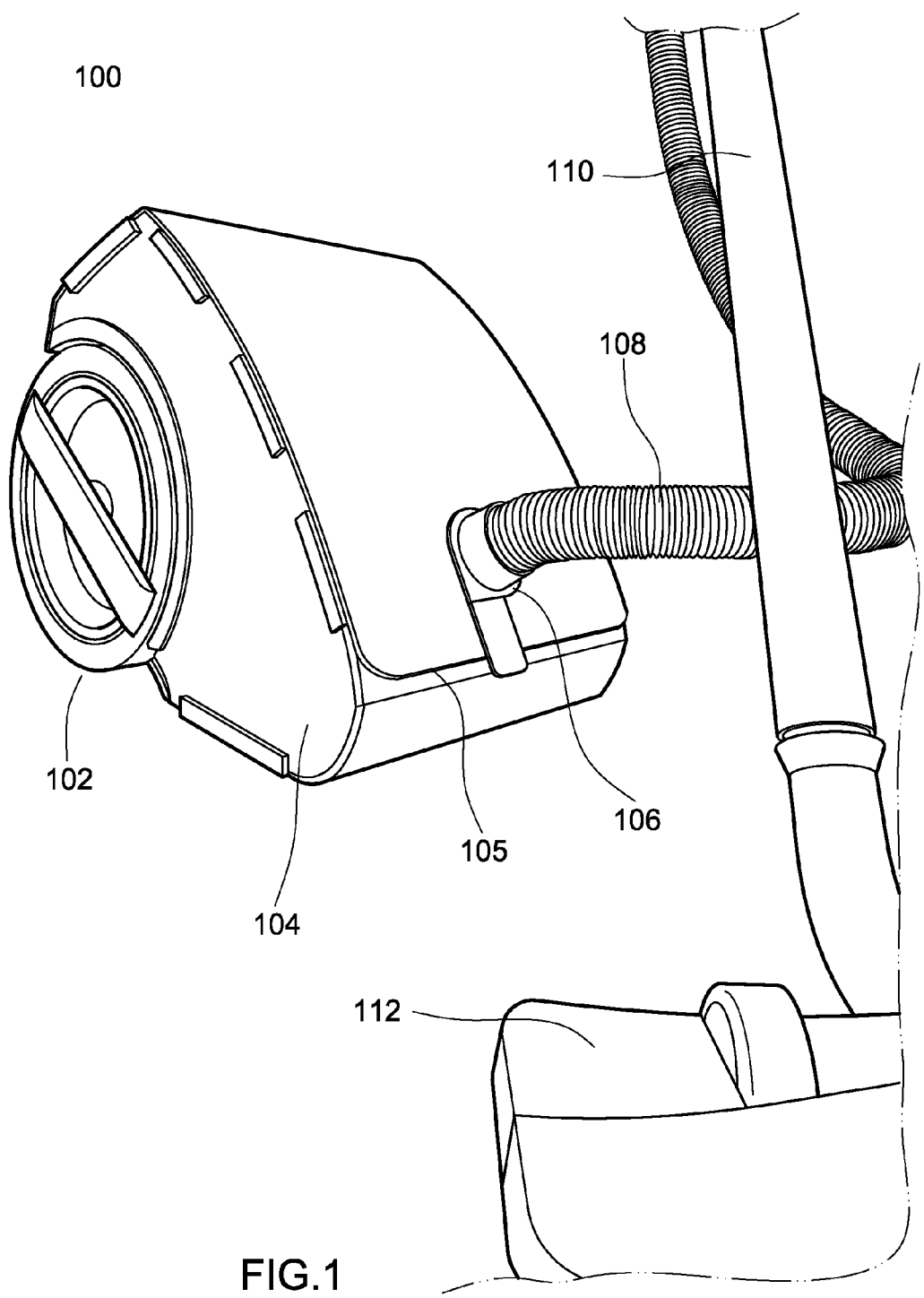
FIG. 1 shows an embodiment of the invention.

FIG. 1 shows an embodiment of the invention, which is a vacuum cleaner. The vacuum cleaner has a main body 100. The main body 100 is separable into a motor housing 102, a dust-bag-housing 104, which are wrapped around by an overlaying panel 700.

For the purpose of this embodiment, the dust-bag-housing 104 is considered positioned at the 'front' of the main body 100. The overlaying panel 700 also forms a lid 105 which covers a chamber inside the dust-bag-housing 104. A hose adapter 106 is secured to the base near front wall of the chamber, which is a conduit that extends from the inside of the chamber to the outside the dust-bag-housing 104. A hose 108 is connected to the part of the hose adapter 106 outside the dust-bag-housing 104. The hose 108 is in turn connected to a wand 110. The distal end of the wand 110 is attached with a suction mouthpiece 112. When the vacuum cleaner is in operation, the wand 110 is useable to direct the suction mouthpiece 112.

The suction mouthpiece 112 and the wand 110 are partly truncated in FIG. 1.

Figure 2:
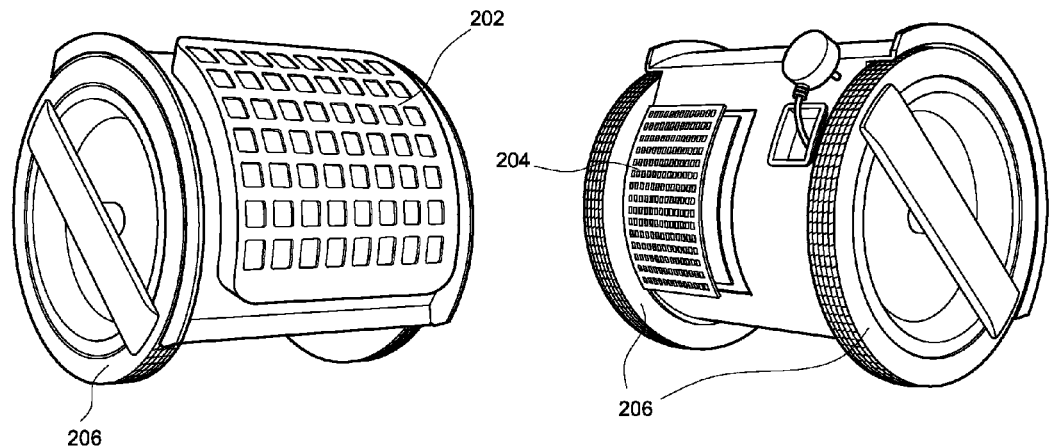
FIG. 2 shows a part of the embodiment of FIG. 1.

FIG. 2 shows the motor housing 102 without the dust-bag-housing 104 in two different viewing angles. The motor housing 102 is made of plastic and has an air inlet 202 and an air outlet 204. The air inlet 202 has a surface which is perforated to allow air to pass through. Furthermore, the motor housing 102 has sides which may be installed with wheels 206 for wheeling the main body 100 on the ground. Contained in the motor housing 102 are all the electrical parts required for the operation of the vacuum cleaner.

Figure 3:
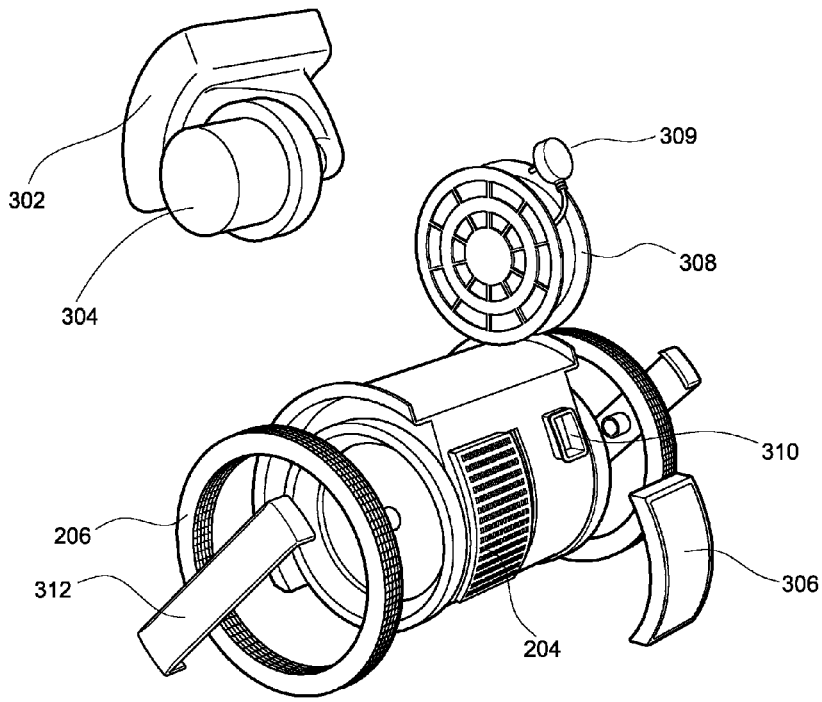
FIG. 3 is an exploded view of the part shown in FIG. 2.

FIG. 3 is a schematic exploded view of some of the electrical parts contained in the motor housing 102. The air inlet 202 covers over an airpath device 302. The airpath device 302 is a funnel which has a tapered end connected to a motor 304. In operation, motor 304 pulls in air though the air inlet 202, through the airpath device 302 and dispels the air through the air outlet 204. A filter 306 is provided under the air outlet 204, inside the motor housing 102, to filter the air before dispersion.

A cable rewind assembly 308 having a plug 309 is also provided within the motor housing 102, to allow the motor 304 to draw on electricity. The cable can be pulled out of the motor housing 102 through a cable exit 310 on the motor housing 102. For convenience, the cable rewind assembly 308 is biased to roll the cable in, such as by a coil spring (not illustrated).

Figure 4:
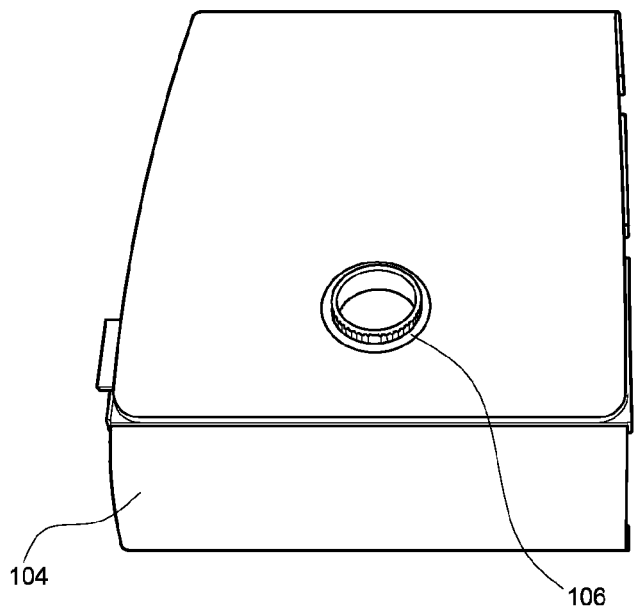
FIG. 4 is a front view of a part of the embodiment of FIG. 1.
Figure 5:
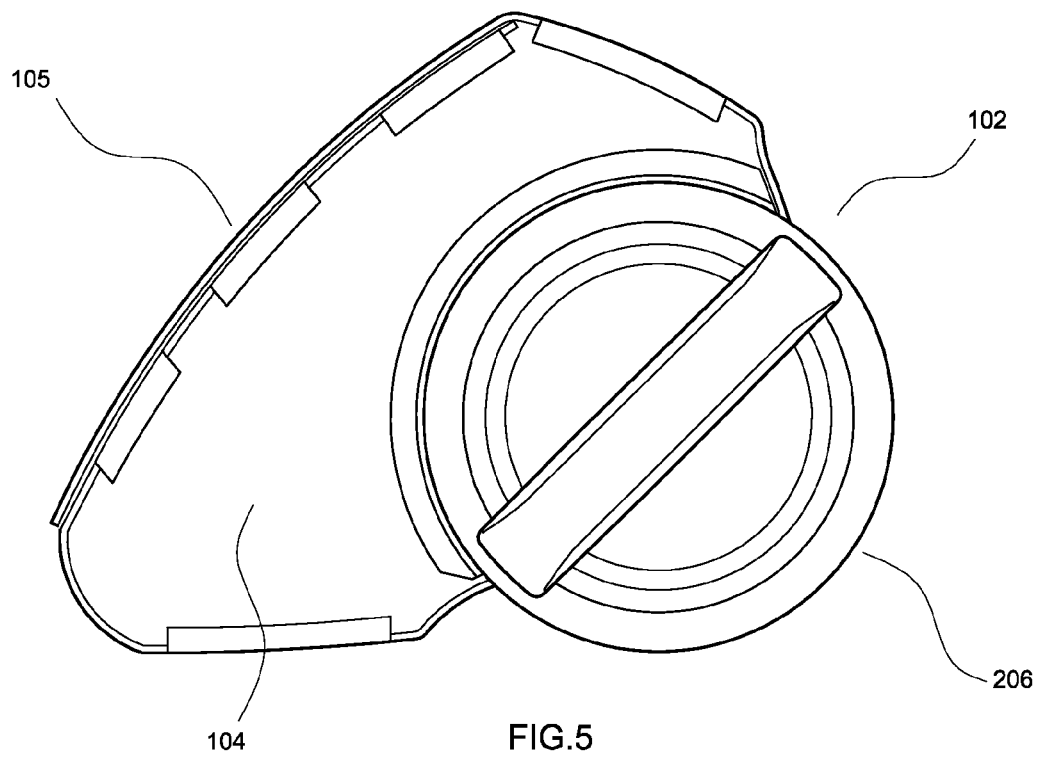
FIG. 5 is a side view of a part of the embodiment of FIG. 1.
Figure 6:
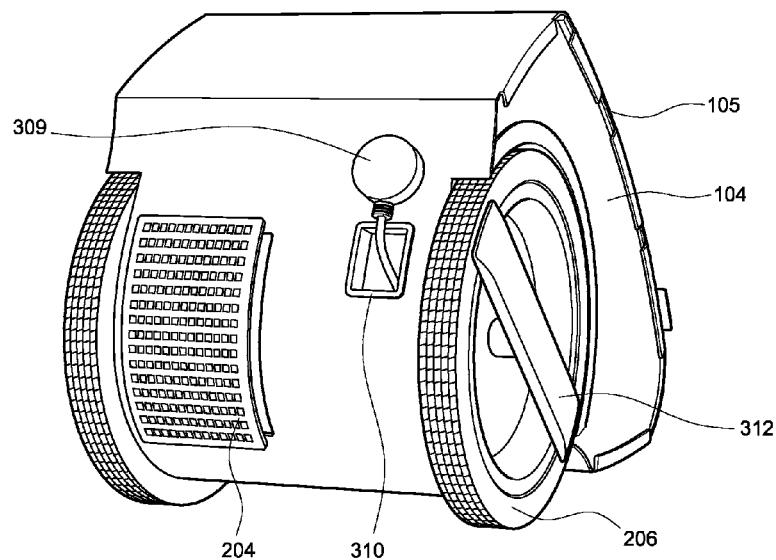
FIG. 6 is a back view of a part of the embodiment of FIG. 1.

FIG. 4 is a 'front' view of the main body 100 without the hose 108 attached, wherein the dust-bag-housing 104 is fully visible over the motor housing 102. FIG. 5 shows a corresponding 'side' view of the main body 100, wherein the dust-bag-housing 104 is seen installed snugly onto the motor housing 102, such that the main part of the motor housing 102 visible are the wheels 206. FIG. 6 is the main body 100 in the back view, with the air outlet 204 and cable exit 310 on the motor housing visible. The plug 309 on the cable is shown extending from the cable exit 310.

Figure 7:
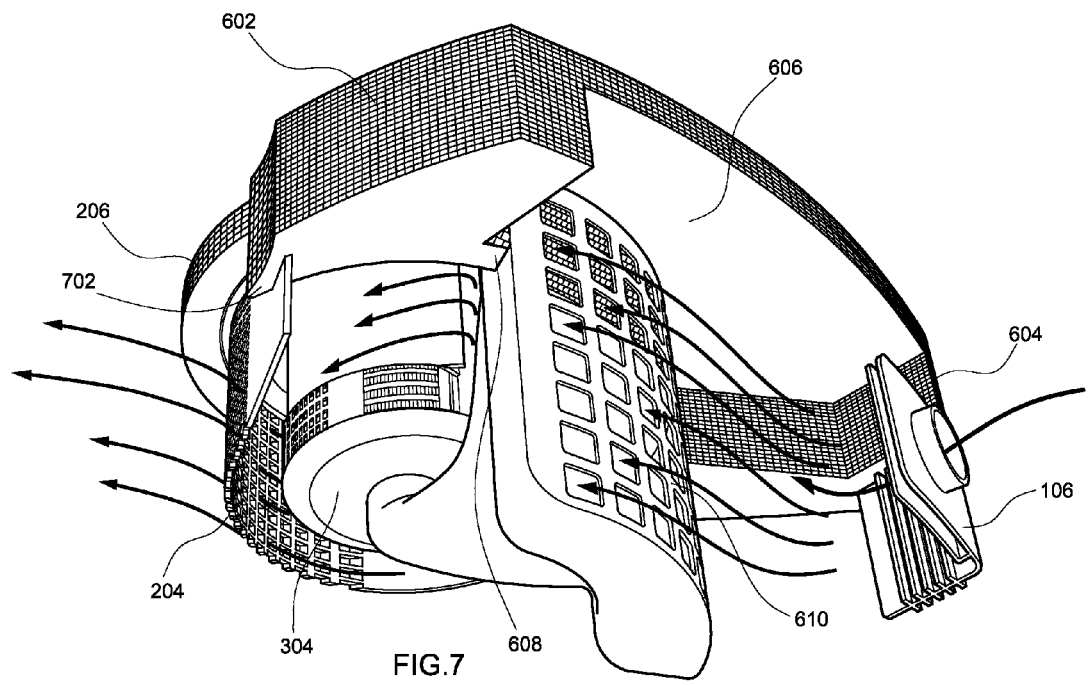
FIG. 7 is an open view of the embodiment of FIG. 1.

FIG. 7 is a dissected view of the dust-bag-housing 104 installed on the motor housing 102. The dust-bag-housing 104 is assembled of a housing panels 104a (see also FIG. 9), which are made of paper. Each housing panel 104a has sufficient rigidity and thickness to permit use of the housing panels 104a in the construction of the dust-bag-housing 104.

Preferably, the housing panels 104a are made of double walled corrugated cardboard, which is most likely 150k. '150' refers to the weight of the card where there is 150 grams per metre squared. 'K' refers to the type of cardboard paper, i.e. kraft paper which is stronger and not recycled, and which allows coating to be applied onto the paper more easily, but which can still be recycled after.

Preferably, the cardboard is treated with a flame retardant, such as Fireretard™ which is produced by a company called 'Corstat' in the United Kingdom. This flame retardant is a water based system containing a wetting agent, designed to increase the rate and depth at which the fire retardant will penetrate paper. The flame retardant is applied by spraying onto the cardboard. To some extent, this flame retardant increases the surface strength of the cardboard and improves rigidity and reduces breathing through the cardboard, strengthening the strength of the vacuum.

The housing panels 104a are assembled and placed together adjacent one another face-wise, that is, the panels 104a may be flat, with opposing planar major faces of the panels 104a being arranged adjacent or abutting one another. In general, the housing panels 104a forming the side walls 606 have a common perimeter defined by the peripheral edges of the panels 104a that defines the overall shape of the dust-bag-housing 104 from the side view. However, the housing panels 104a between the side walls 606 have a shape the perimeter of which defines the surface of a back wall 602, a front wall 604 and a base 608. Together with the side walls 606 on either side of the dust-bag-housing 104, these walls define the chamber inside the dust-bag-housing 104.

More specifically, there are two groups of panels 104b, 104c between the side walls 606. One group, 'top' panels 104b, is placed on the back and top of the motor housing 102, which extends from the back of the motor housing to an edge of the airpath device 302, short of covering over the air inlet 202 on the surface of the airpath device 302. The top panels 104b on the top of the motor housing 102 forms the back wall 602 of the dust-bag-housing 104. The other group, 'bottom' panels 104c, is secured to the front and bottom of the motor housing 102 and forms the front wall 604 of the dust-bag-housing 104. The bottom panels 104c extend from the lower edge of the air inlet 202 to the front side of the dust-bag-housing 104.

Each housing panel 104a has strong structural strength in the planar direction and can withstand impact against the edge of the housing panel 104a. On the other hand, placing the housing panels 104a together face-wise reinforces the outermost housing panel 104a at either side of the dust-bag-housing against impact on the housing panel's face.

To ensure that all the panels 104a forming the embodiment are kept in place, the preferred way of securing the housing panels 104a together is by cross-panelling. 'Cross-panelling' includes at least one panel having one planar orientation used to hold at least another panel in a different planar orientation into a fixed position. For this purpose an overlaying panel 700 is provided which can wrap around the dust-bag-housing 104 and the motor housing 102.

Figure 7A:
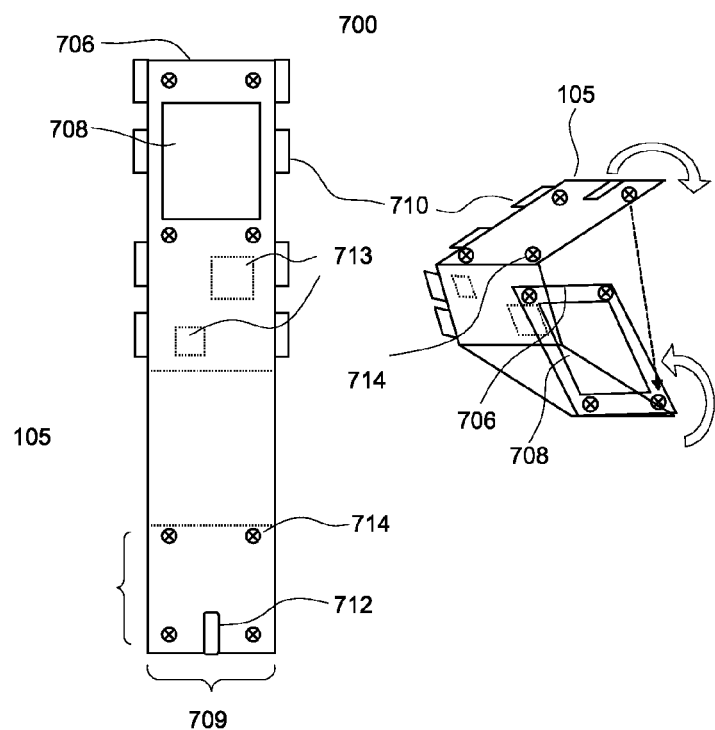
FIG. 7a shows another part of the embodiment of FIG. 1.

The shape of overlaying panel 700 is shown in FIG. 7a, along with a schematic diagram of how the overlaying panel 700 is foldable over itself to wrap around the dust-bag-housing 104 and the motor housing 102. The overlaying panel 700 is made of single walled corrugated cardboard, which is more pliable than the aforementioned double walled corrugated cardboard, so as to be capable of being wrapped around the motor housing 102 and dust bag housing 104 to form the main body 100.

The overlaying panel 700 has a first end 706 which is securable to the edge of the back wall 602 of the dust-bag-housing 104. The overlaying panel 700 is then extended over the front wall 604 and beneath the motor housing 102. A cut-out portion 708 is provided near the first end 706, which is meant to coincide in position to the mouth of the chamber inside the dust-bag-housing 104. The overlaying panel 700 is then folded over the back wall 602 such that the other end of the overlaying panel 700 overlaps the cut-out portion 708, and forms a lid 105 to close over the chamber.

The edge of the lid 105 has another cut-out portion 712 which fits over the hose adaptor 106 extending out from the main body 100.

Furthermore, the part of the overlaying panel 700 which wraps over the back of the housing motor 102 has cut out areas 713 for exposing the air outlet 204 and the cable exit 310.

The width 709 of the overlaying panel 700 is generally flushed to the edge of the dust-bag-housing 104, width-wise. However, the sides of the overlaying panel 700 have flaps 710 for folding against the side-most housing panels 104a of the dust-bag-housing 104.

Figure 7B:
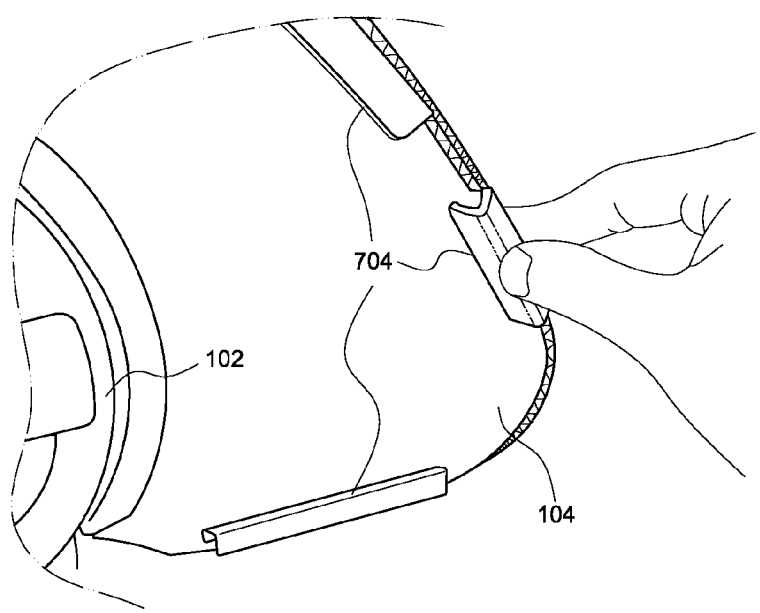
FIG. 7b how the embodiment of FIG. 1 is assembled.

Preferably, clips 704 are used to fasten the flaps 710 to the side-most housing panels 104a by, as illustrated in FIG. 7b. In this way, the overlaying panel 700 holds the housing panels 104a together by means of the clips 704, giving strength to the dust-bag-housing 104.

Thus, the overlaying panel 700 is a 'cross panel' to the other housing panels 104a which allows the possibility of omitting the use of glue or other adhesive to hold the housing panels 104a together. This provides several advantages. The first one is a reduction in use of organic solvents, which is typically present in adhesives. If the dust-bag-housing 104 is assembled by a user in a domestic environment where there is little equipment for handling solvents, this advantage is even more pronounced. Furthermore, if adhesive is not used, the dust-bag-housing can be used almost as soon as it is assembled, since there is no need to wait for adhesive to dry. Also, assembly of the dusts-bag-housing 104 may then be less messy since adhesive is not used.

Yet a further advantage is that the dust-bag-housing 104 can be quickly disassembled in the event that the dust-bag-housing 104 has suffered wear and tear, and needs to be replaced, or if the user simply wishes to change the design of the dust-bag-housing 104 for another one. Furthermore, not using adhesives allow the dust-bag-housing 104 to be dismantled and disposed off as separate panels, which is conducive for compacting rubbish before disposal.

It has been found that impact resistance in corrugated cardboard is effective in dampening impact against the dust-bag-container, particularly if the corrugated cardboard is aligned by design to be in a direction to receive typical impact which occurs during use in a domestic environment. The impact resistance is comparable to that of an injection molded plastic vacuum housing.

Figure 8:
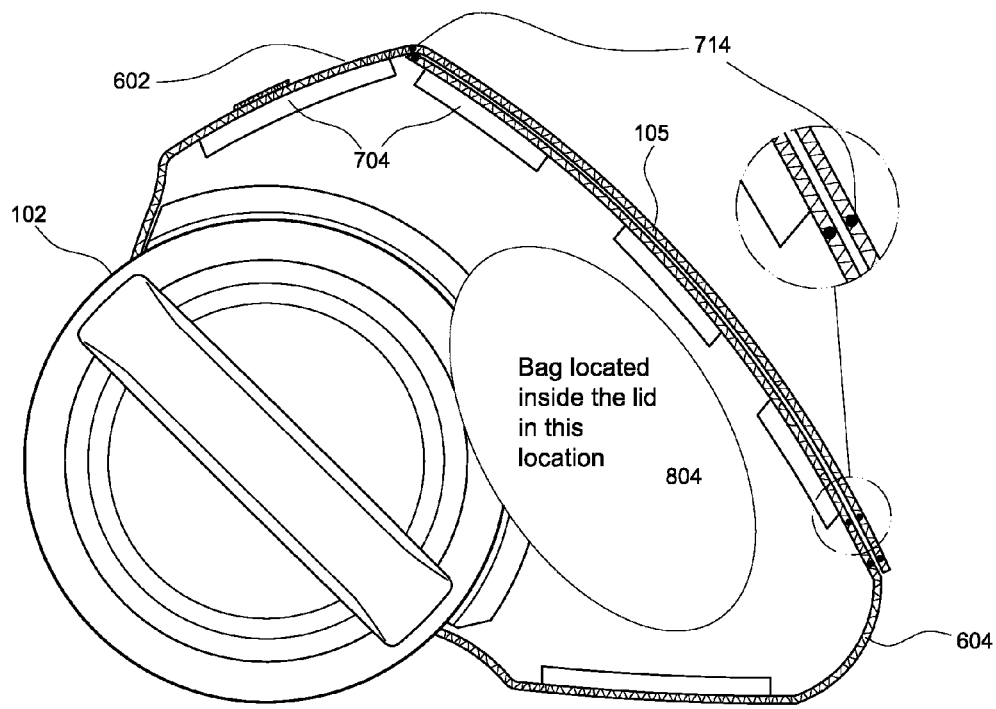
FIG. 8 shows a part of the embodiment of FIG. 1 in greater detail.

Magnetic devices 714 are placed in suitable locations in the overlaying panel 700 so that, when the overlaying panel 700 overlaps onto itself around the dust-bag-housing 104, the lid 105 may be held over the chamber magnetically. FIG. 8 shows this more clearly from a side view, indicating that corresponding magnetic materials placed near the back wall 602 and the front wall 604 to allow the lid 105 to be held closed magnetically.

Preferably, the wheels 206 attached to the dust-bag-housing 104 are made of layers of cardboard rings. The layers of ring are secured to each other to form the wheel 206 by a bracket 312.

When the motor 304 is in operation, air is sucked in from the hose, hose adapter 106, into the chamber, drawn through the air inlet 202, base 608, airpath device 302 and into the motor 304 to be expelled through the air outlet 204. This creates a vacuum in the chamber, which creates suction at the hose adapter 106, hose 108, wand 110 and suction head 112.

In order for the vacuum cleaner to be useable to trap rubbish, an air-permeable dust bag 804 may be installed inside the chamber. See FIG. 8. The mouth of the dust bag is closed (this is not specifically illustrated) onto the part of hose adapter 106 which is inside the chamber. Thus, air sucked in from the wand 110 has to pass from the hose 108, through the dust bag 804 and the chamber, through the motor housing 102 before it can be expelled out of the air outlet 204. Any dust or rubbish carried in the air is therefore trapped in the dust bag 804. The dust bag 804 can be easily changed since the lid 105 is held in place only by magnets 714.

Advantageously, the housing panels 104a and the overlaying panel 700 are sucked-in by the vacuum, causing them to press against each other when the motor 304 is in operation. This improves the air-sealing of the dust-bag-housing 104.

The motor housing 102 and the dust-bag-housing 104 are the most space occupying parts of the vacuum cleaner. By containing all the moving parts, such as the motor 304, and electrical parts in one motor housing 102, and keeping the dust-bag-housing 104 free of moving parts and electrical parts, the dust-bag-housing 104 may be designed relatively free of constraints from electrical and mechanical concerns.

Figure 9:
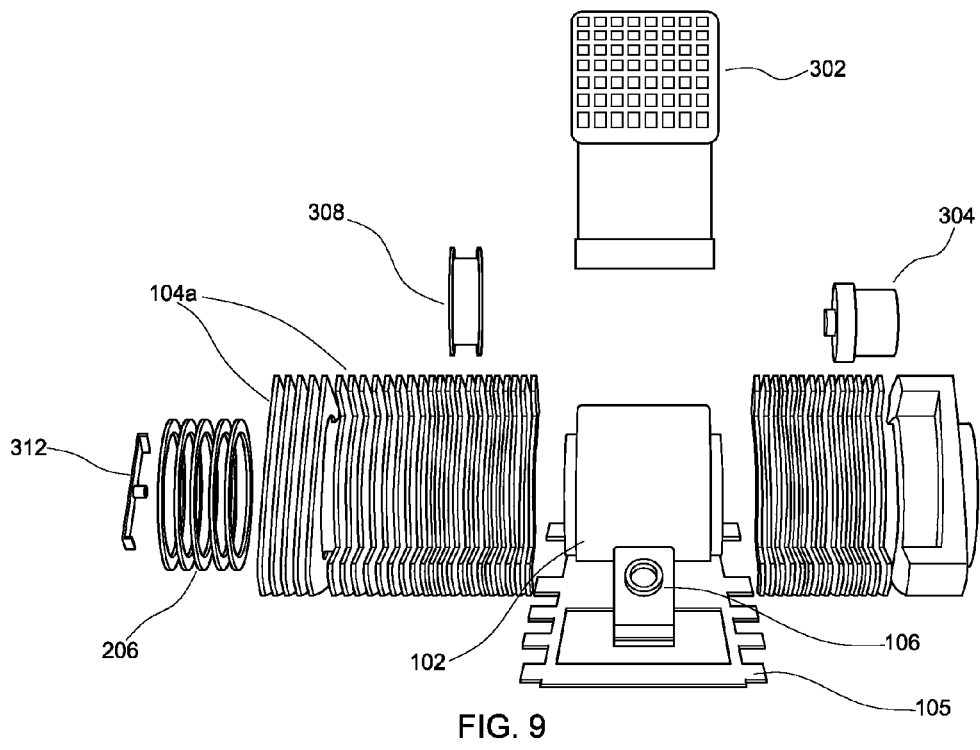
FIG. 9 shows an assembly kit for the embodiment of FIG. 1.
Figure 10:
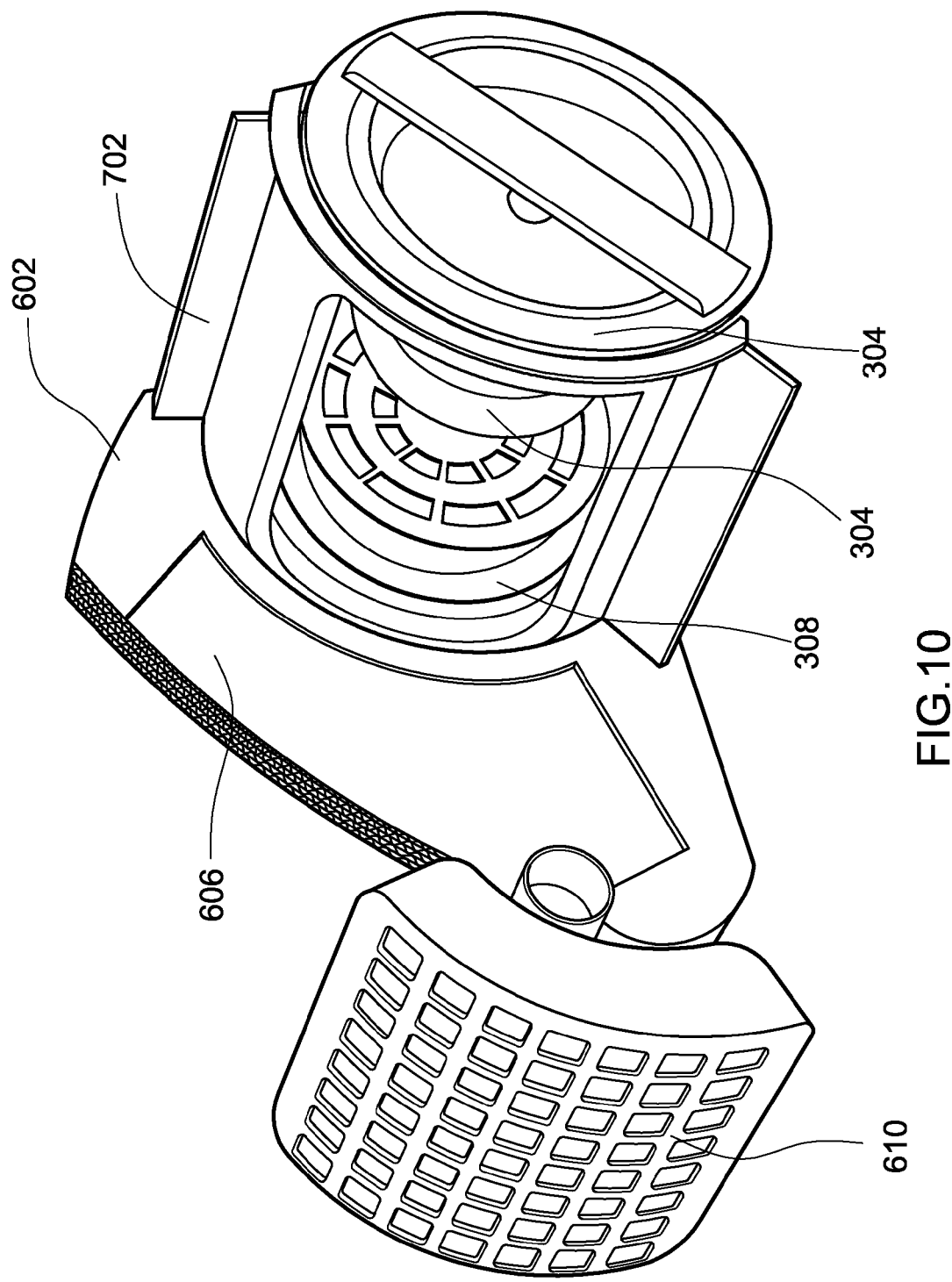
FIG. 10 shows the variation as FIG. 9 in a different view.

One of the overall advantages of the embodiment is that the paper based dust-bag-housing 104 is easily assembled by a user himself. FIG. 9 is an illustration which lays out the separable parts of the vacuum cleaner, which may be provided as a user assembly kit. To assemble the vacuum cleaner, the user need only arrange the housing panels 104a, 104b, 104c into the dust-bag-housing 104, place the dust-bag-housing 104 on top of the motor housing 102 to form the main body 100, wrap the overlaying panel 700 around the dust-bag-housing 104 and motor housing 102 to form the main body 100, clip the housing panels 104a onto the overlaying panel 700 to secure the assembled main body 100, secure the hose adapter 106 inside the chamber, place a dust bag 804 inside the chamber secured to the hose adapter 106, and attach the hose 108, wand 110 and suction head 112.

The motor 304 may need to be manufactured in a factory but this is actually convenient for regulatory approval testing. The cardboard housing panels 104a, however, need not be cut out in a factory. The shapes of the housing panels 104a and the overlaying panel 700 may be stamped onto sheets of cardboards, so that the user may cut out the housing panels 104a by himself.

Alternatively, the user may download an electronic document containing the outlines of the housing panels 104a, to be stenciled on to a piece of cardboard by himself. The advantage is that only the motor housing 102 would need to be shipped from factory.

Other than the dust-bag-housing shown in the illustrations, different shapes and designs of the dust-bag-housing 104 is possible as long as the dust-bag-housing is capable of being secured to the motor housing 102. Furthermore, the cardboard material allows the user to paint onto the surface. Such design flexibility makes the vacuum cleaner commercially attractive, since product uniqueness is a highly desirable. For example, the dust-bag-housing may be provided easily in shapes which are delightful to children.

As paper is a good absorber of sound, the embodiment has reduced noise emanating from the dust-bag-housing 104. This is further improved by placing the dust-bag-housing 104 over and on the motor housing 102, which further muffles noise from the motor housing 102.

A further advantage is that, in making the dust-bag-housing 104 from the motor housing 102 as separate parts, heat generated by the motor 304 is prevented from warming the dust-bag-housing 104, aided by the fanning effect of air flow through motor 304 during operation.

Figure 11A:
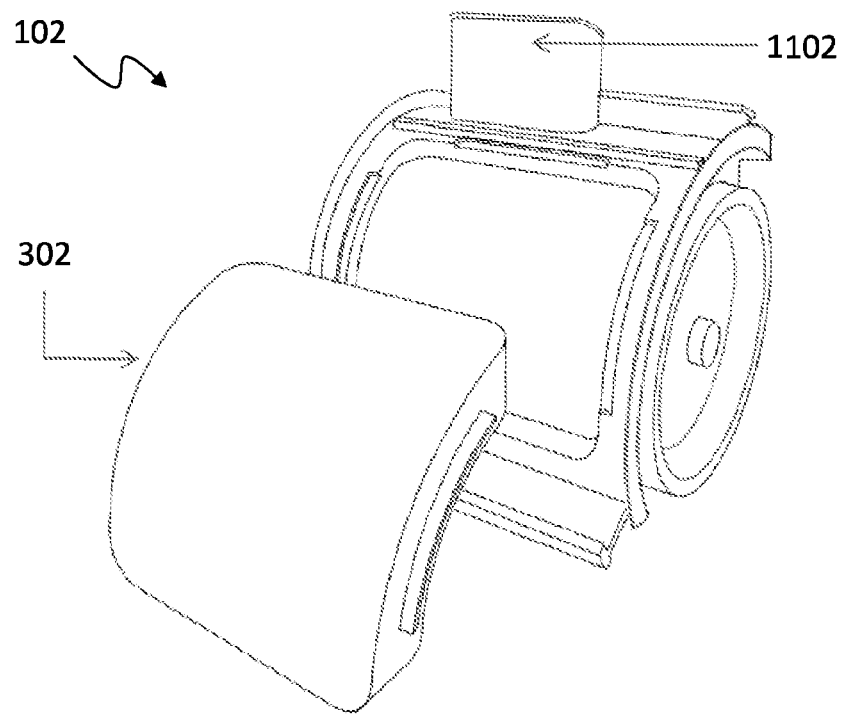
FIGS. 11a to 11y is a series of figures showing the steps of assembling the embodiment of FIG. 1.
Figure 11B:
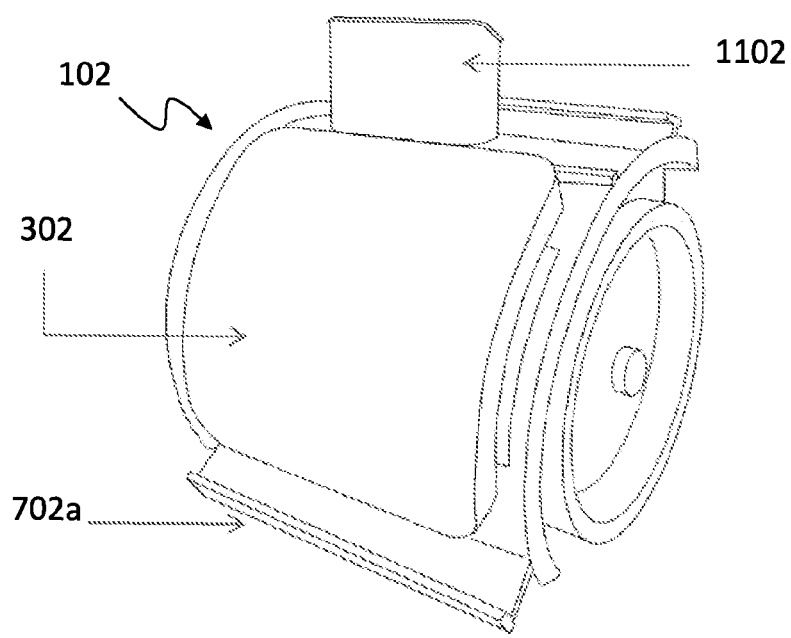
Figure 11C:
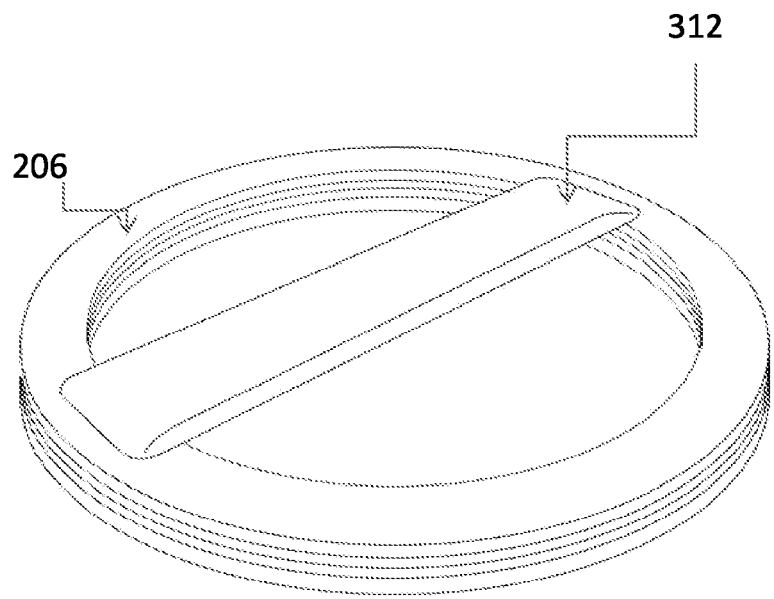
Figure 11D:
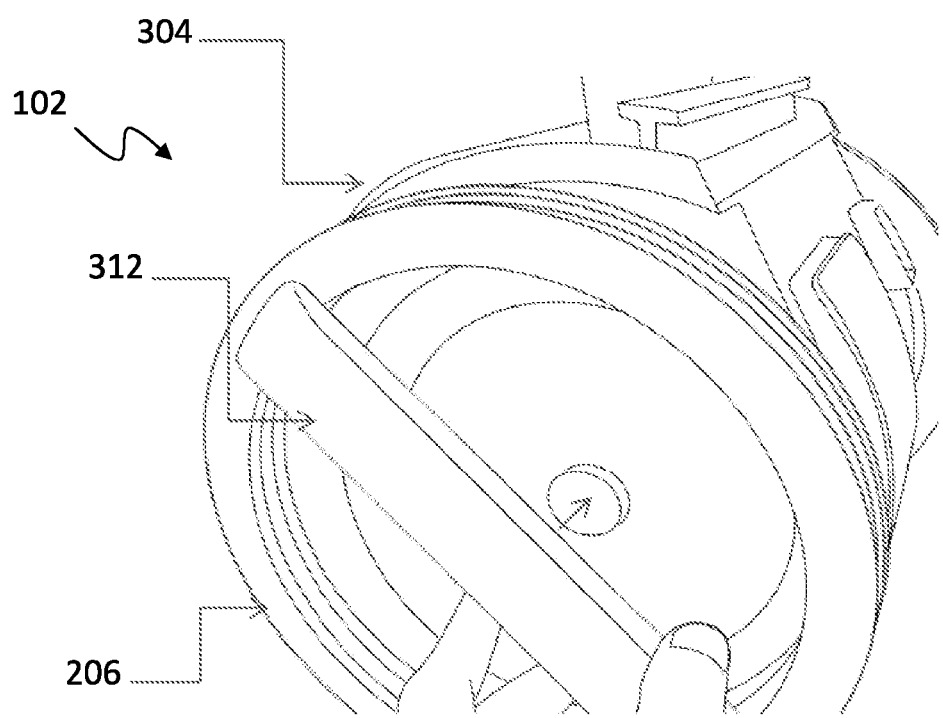
Figure 11E:
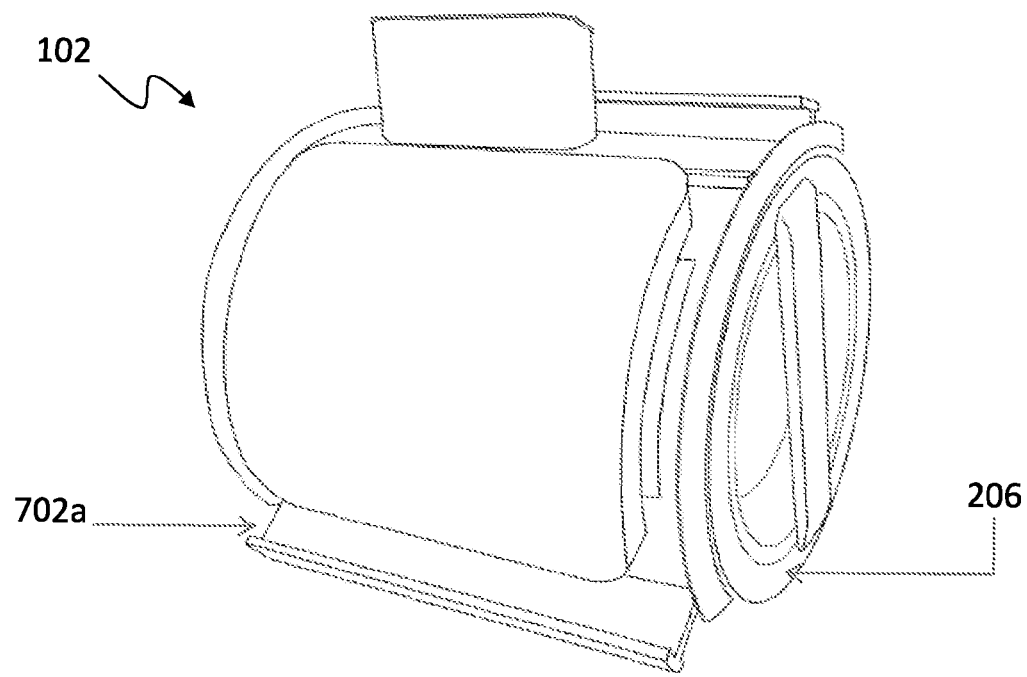
Figure 11F:
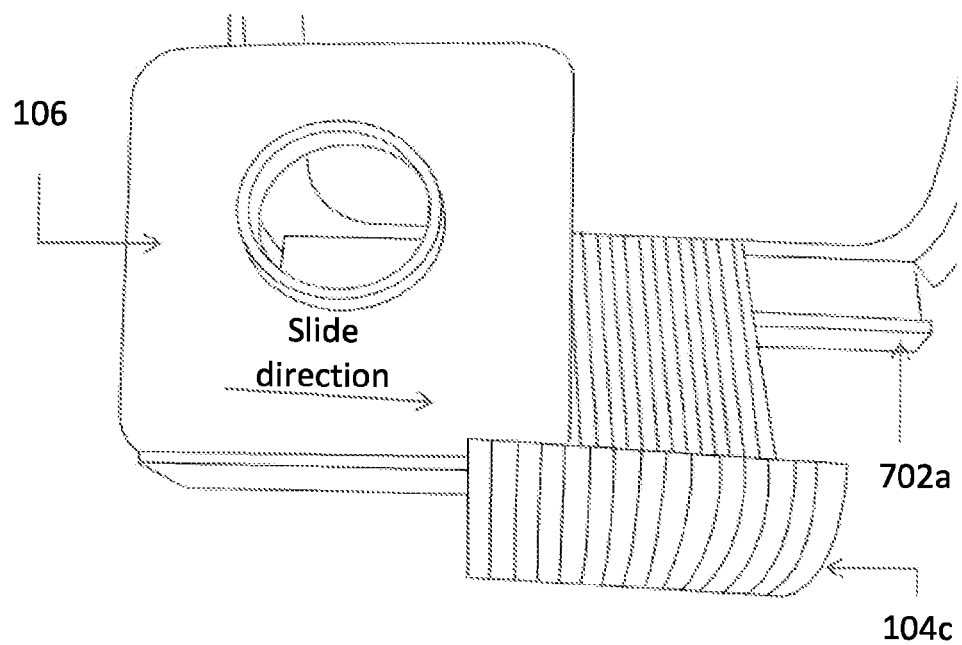
Figure 11G:
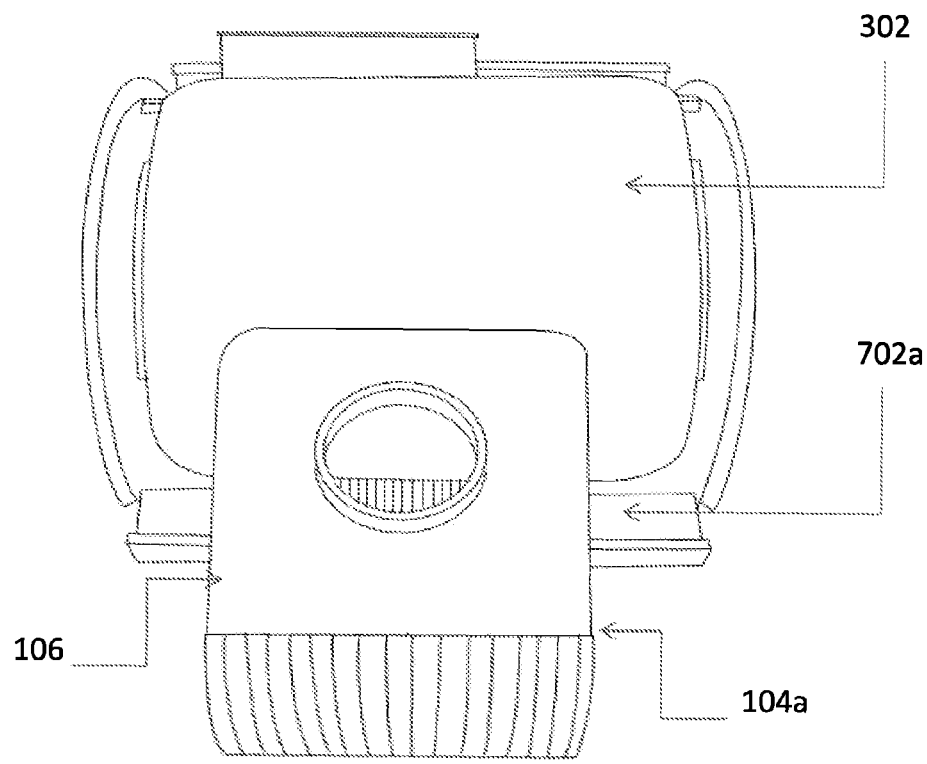
Figure 11H:
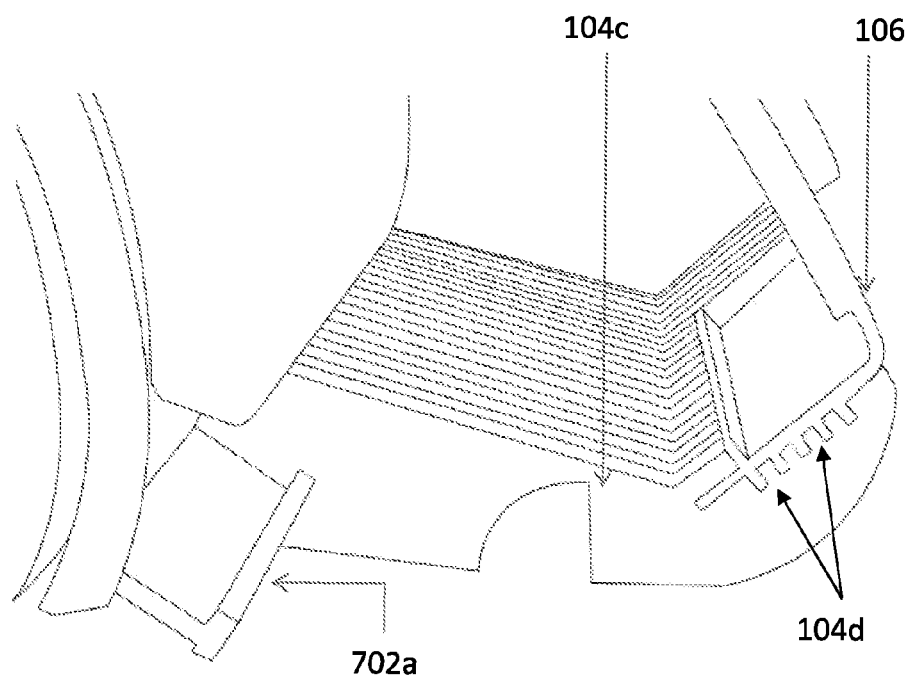
Figure 11I:
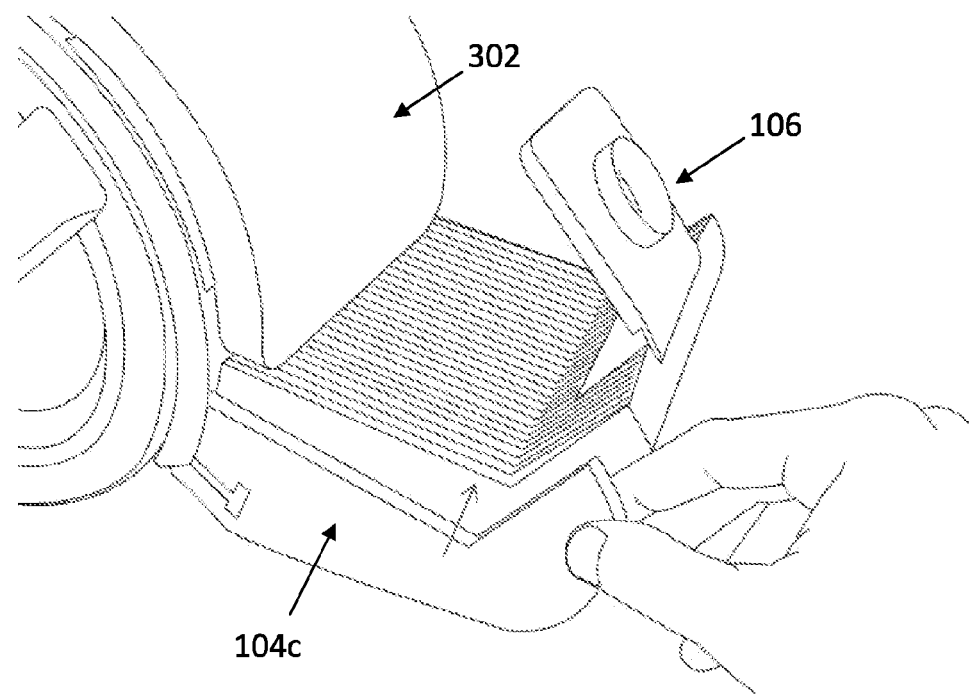
Figure 11J:
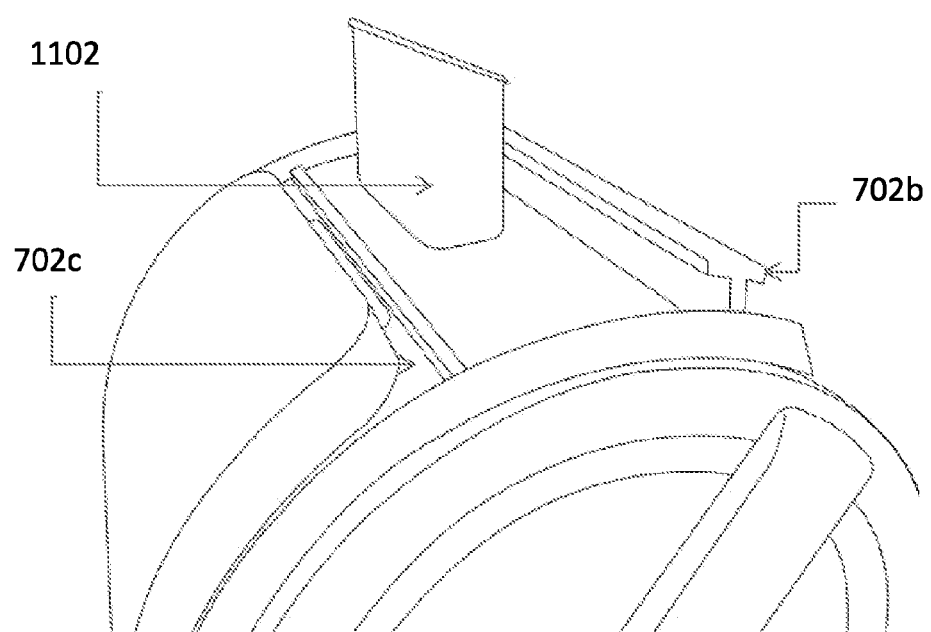
Figure 11K:
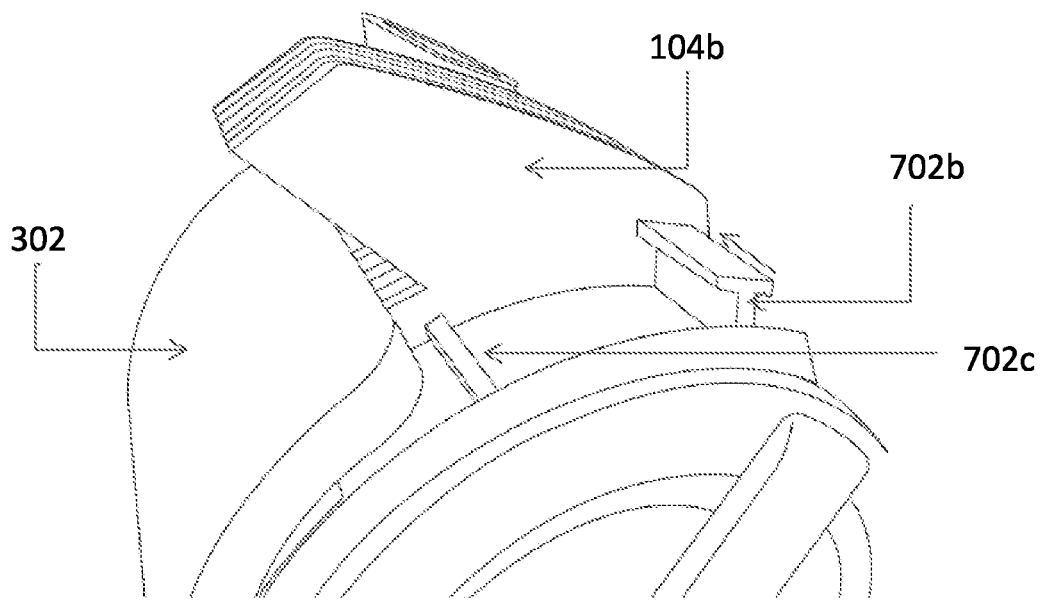
Figure 11L:
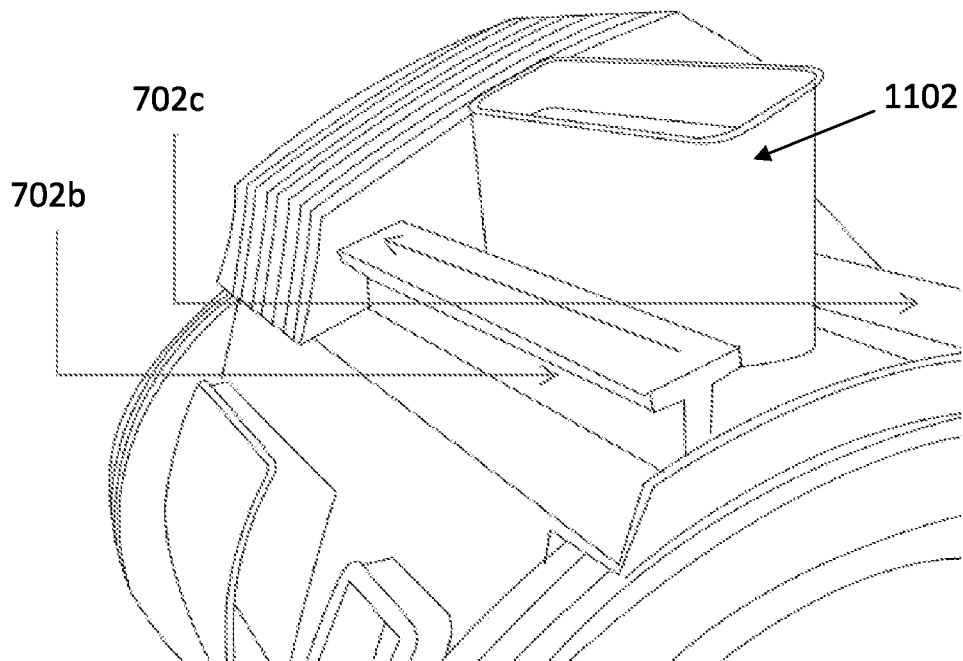
Figure 11M:
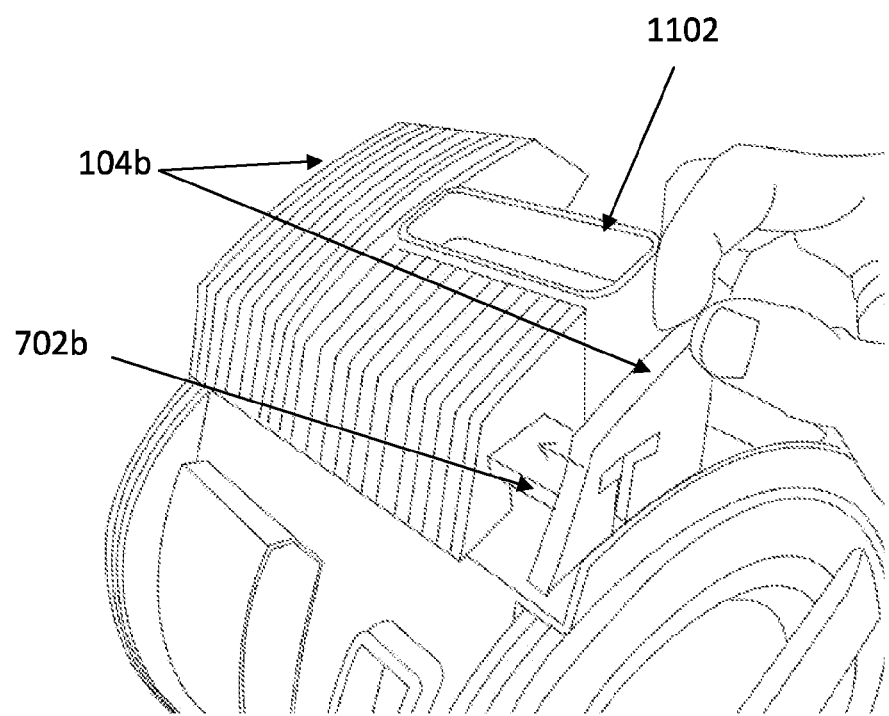
Figure 11N:
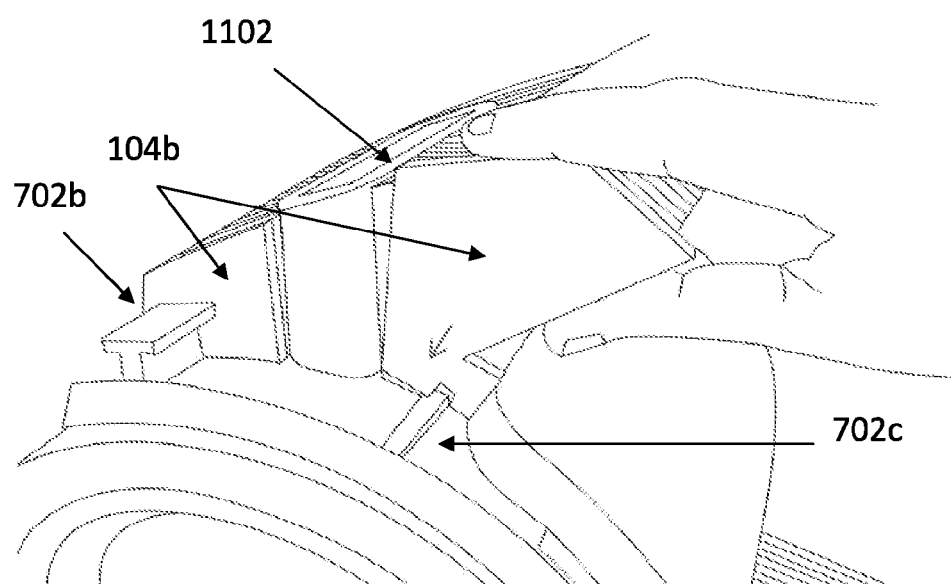
Figure 11O:
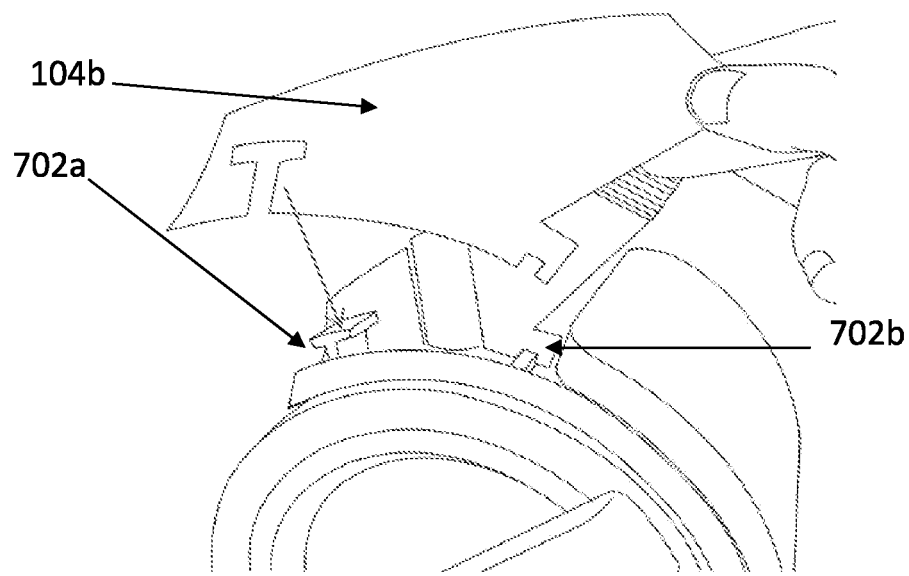
Figure 11P:
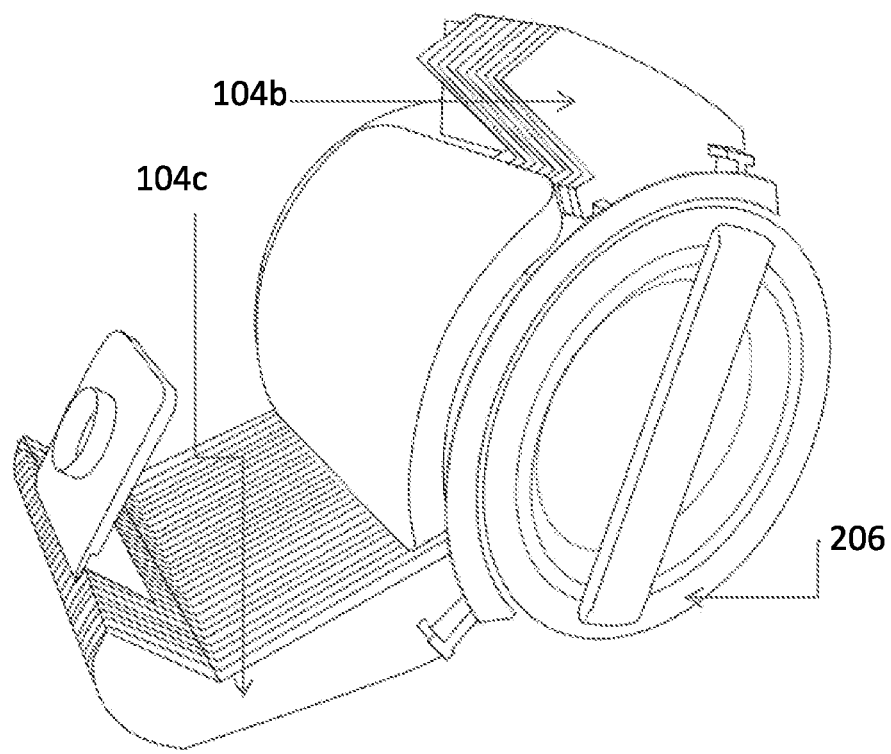
Figure 11Q:
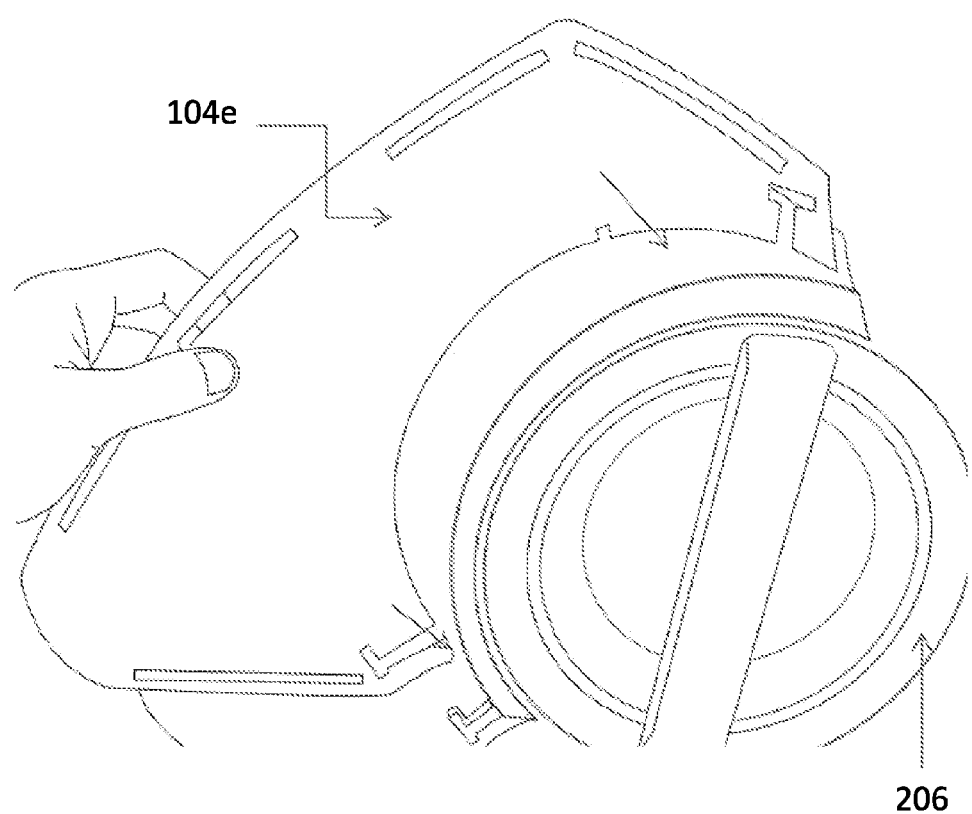
Figure 11R:
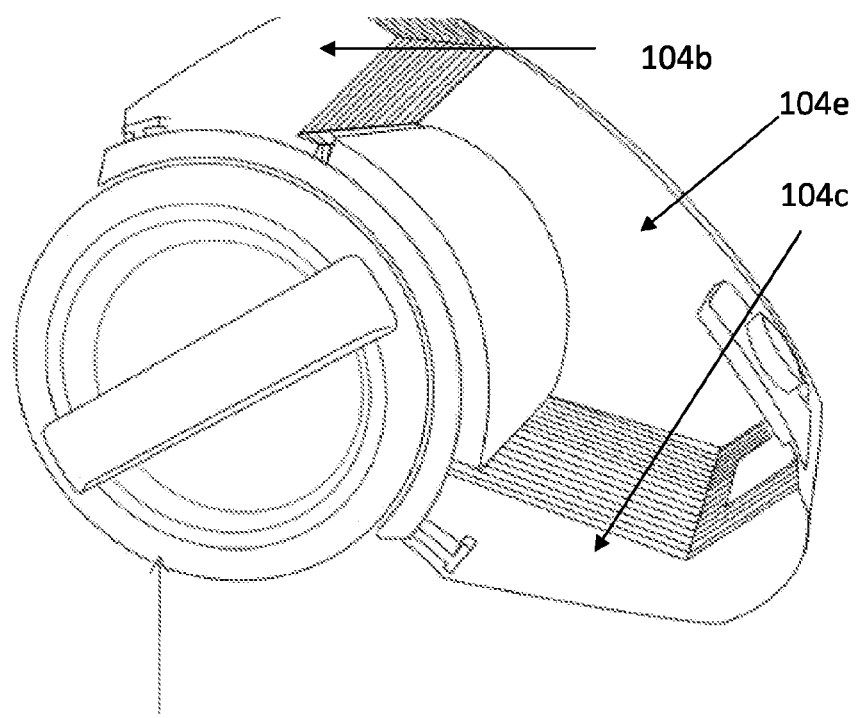
Figure 11S:
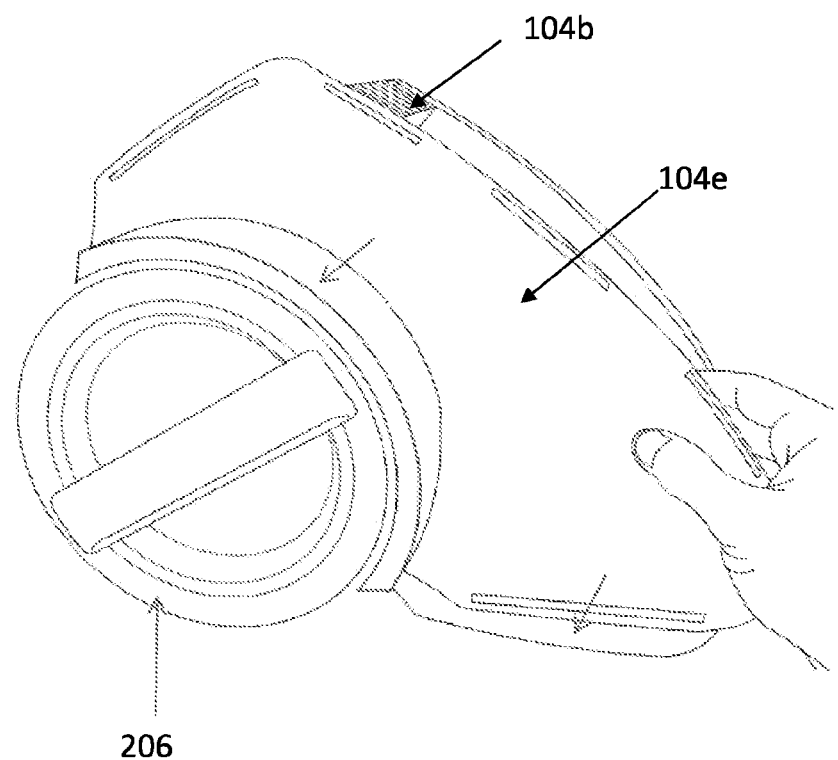
Figure 11T:
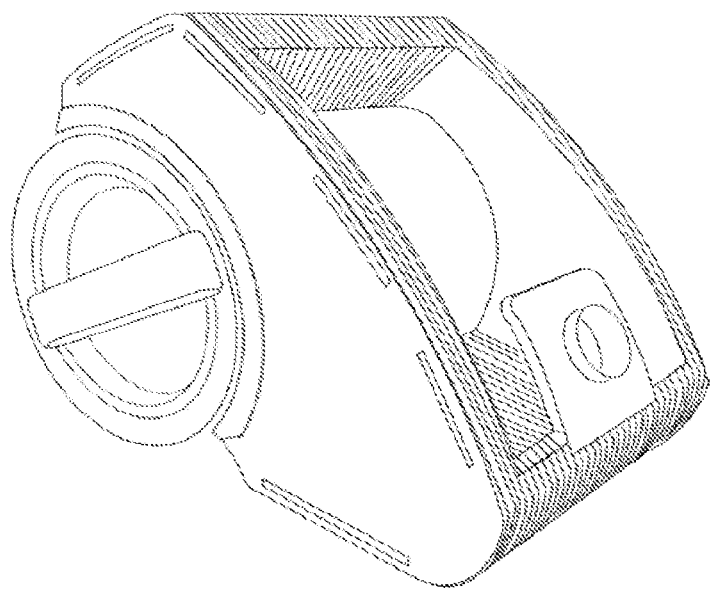
Figure 11U:
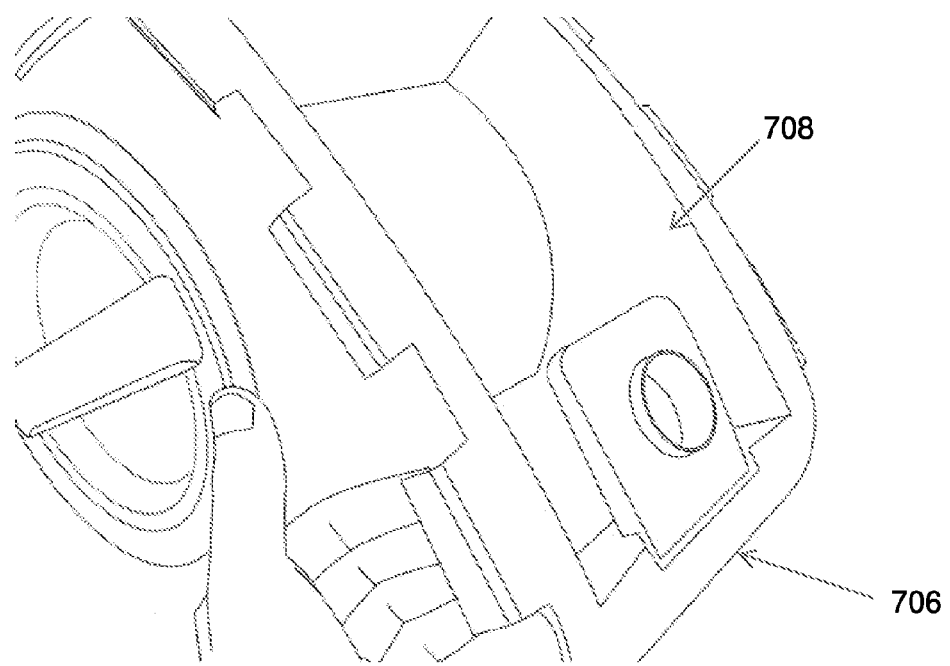
Figure 11V:
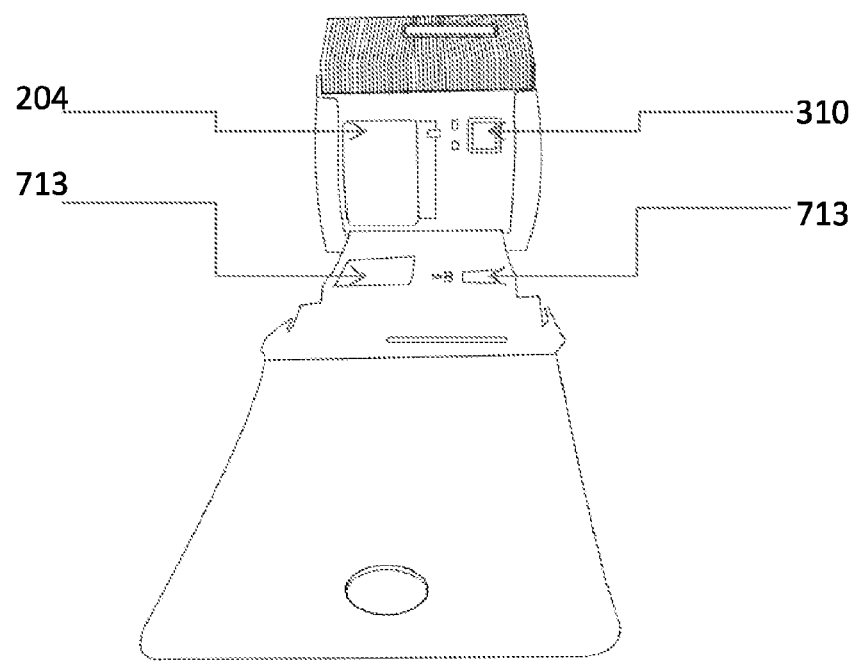
Figure 11W:
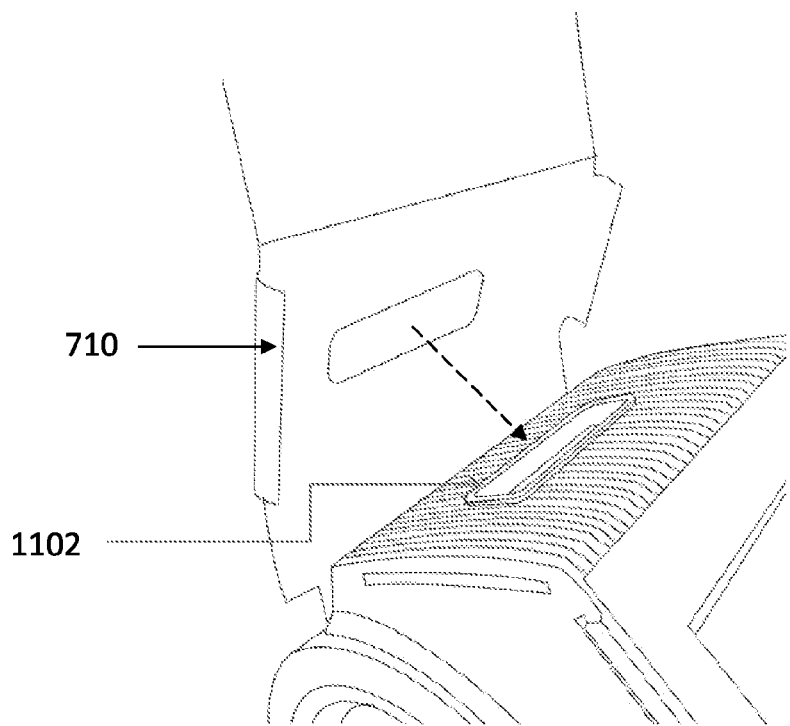
Figure 11X:
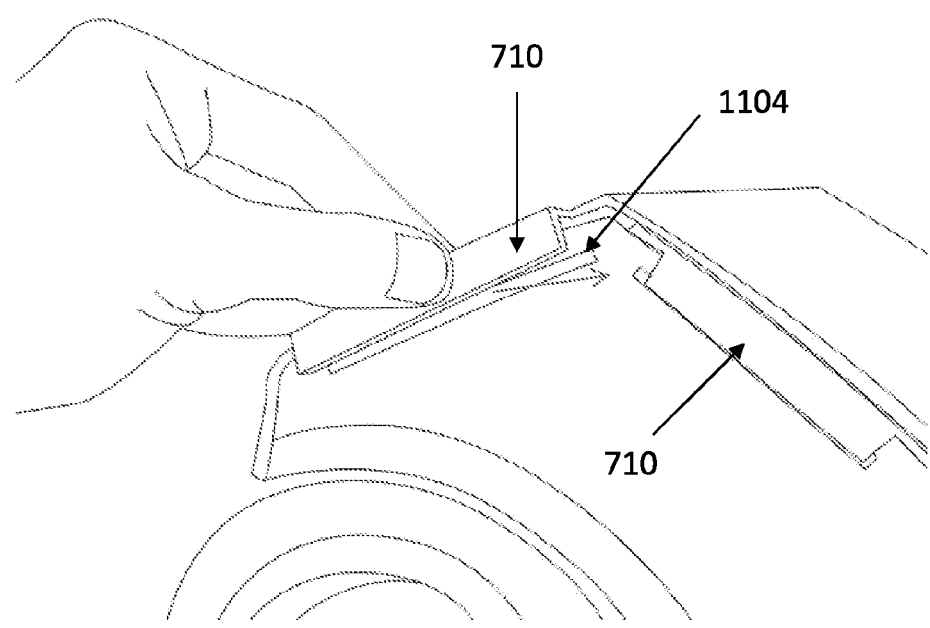
Figure 11Y:
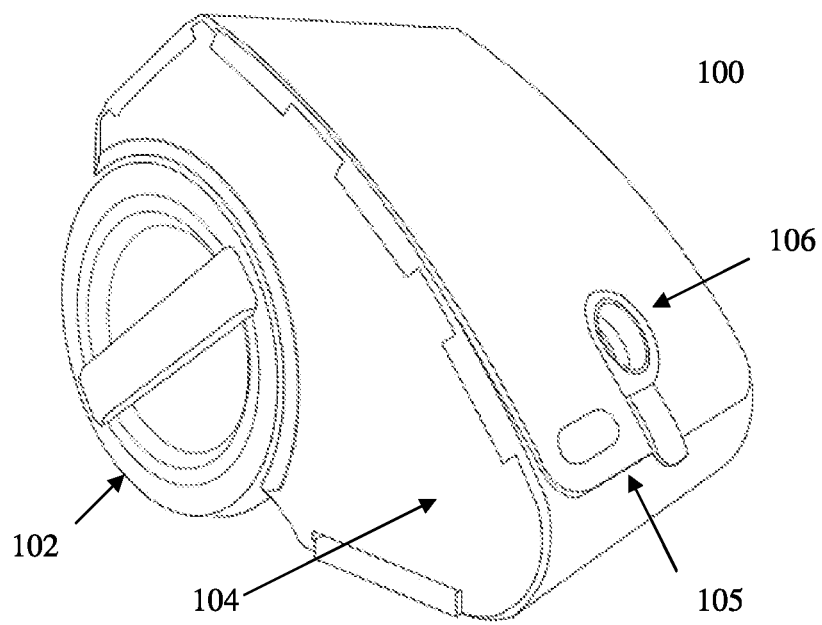

FIG. 11a to FIG. 11y is a series of drawings showing the steps by which the main body 100 may be assembled. In assembling the main body 100, the motor housing 102 has to be installed first, by installing the airpath 302 into the mouth of the motor housing 102. See FIG. 11a and FIG. 11b.

It should be noted that in the drawings of FIG. 11a to FIG. 11x, the perforations on the surface airpath 302 for air to flow through are not illustrated, unlike in FIG. 2. Furthermore, in FIGS. 11a, 11b, 11j, 11l-11n and 11w, a sensor enclosure 1102 (also in FIG. 6) is shown which is hollow and has an open mouth that extends to an outer side of the housing 104. This sensor enclosure 1102 may hold a sensor, such as a beam-break sensor (not shown), which operates an on/off switch in a toggle-type manner. The on/off switch may control the motor, whereby successively inserting a hand, or another object, into the sensor opening enclosure 1102 toggles the motor on and off.

Subsequently, cardboard rings are placed together and secured with a wheel brace to form the wheels 206 of the embodiment. See FIG. 11c. FIG. 11d illustrates one of the wheels being fitted to the motor housing 102. The assembled motor housing 102 installed with the wheels made of cardboard rings is shown in FIG. 11e.

The next step is to secure bottom panels 104c to a guide 702a provided at the front bottom side of the motor housing 102. FIG. 11f shows that only a number of panels 104c is positioned the centre of the front bottom part of the motor housing 102, to form a cradle for securing the hose connecter 106 thereto. Typically, the inner side of the panels 104c has slits 104d so that a fin on the hose adapter 106 may be slid into the slits. See FIG. 11h. However, the specific mechanism for securing the hose adapter 106 to the panels 104c can be different and, thus, there is no need to provide specific details of the mechanism here.

FIG. 11g shows the hose adapter 106 secured to the panels 104c.

FIG. 11h and FIG. 11i show the subsequent step of assembling other bottom panels 104c. As the hose adapter 106 is generally positioned at the centre of the motor housing 102, an equal number of panels 104c is added to either side of the hose adapter 106.

FIG. 11j is a close up view of guides 702b, 702c provided at the back and top part of the motor housing 102. FIG. 11k, FIG. 11m, FIG. 11n and FIG. 11o show the steps of slotting the top panels 104b onto these guides 702b, 702c. FIG. 11m shows yet smaller top panels 104b added to the guide 702b behind the sensor opening 1102. FIG. 11n show other smaller top panels 104b added to the guides 702b, 702c in front of and behind of the sensor opening 1102. Subsequently, as shown in FIG. 11o, larger top panels 104b are placed to sandwich both the sides of the sensor housing 1102 and the smaller top panels 104b. In this way, the sensor housing 1102 are completely surrounded by top panels 104b.

FIG. 11p and FIG. 11l show the next step of adding side panels 104e to the outermost sides of the motor housing 102. In particular, FIG. 11q shows a panel 104e added to the outer-most side, and placed over the arch on the motor housing 102 covering the wheel 206. These side panels 104e are longer than the top and bottom panels 104b, 104c, extending from the top back side to the front bottom side of the motor housing to form a continuous sidewall for the dust-bag-housing 104.

FIG. 11r and FIG. 11s are views of the different panels, 104a, 104b, 104c, 104e assembled on the motor housing 102 from different angles.

FIG. 11t shows the shape of the dust-bag-housing 104 being basically formed by the panels 104b, 104c, 104e. To complete the assembly, the overlaying panel 700 is required to hold the panels 104b, 104c, 104e together by cross-panelling.

Thus, in the next step, the overlaying panel 700 is wrapped around the motor housing 102 and the assembled panels 104b, 104c, 104e. FIG. 11u shows the cut-out portion 708 of the overlaying panel 700 laid over the mouth of the dust-bag-housing 104. At the back of the motor housing, the overlaying panel 700 is laid onto the motor housing 102 in such a way that cut out areas 713 in the back of the overlaying panel 700s allow the filter 204, cable exit 310 and the sensor housing 1102 to be accessible through the overlaying panel 700. See FIG. 11v.

FIG. 11w shows that the overlaying panel 700 having wrapped around the motor housing 102, such that the overlaying panel 700 is laid over the top of the motor housing 102 but allowing access to the sensor housing 1102 through a cut-out portion.

FIG. 11w also shows the sides of the overlaying panel 700 having flaps 710 for folding against the side-most housing panels 104a of the dust-bag-housing 104. A complementary aperture in the overlaying panel 700 is positioned in registration with the mouth of the sensor enclosure 1102, so that the sensor enclosure 1102 is accessible therethrough from outside the housing for turning the machine on and off in the above-described manner.

FIG. 11x shows how flaps 710 extending from the side of the overlaying panel 700 are inserted into slits 1104 in the side most panels 104d to secure all the panels 104a as assembled. Clips 704 may be used to fasten the flaps 710 to the side-most housing panels 104a by, as illustrated in FIG. 7b. FIG. 11y shows an assembled main body 100, without the vacuum hose and wand attached.

Therefore, the embodiment is a vacuum cleaner 100 comprising a dust-bag-housing 104 made of paper. Furthermore, the dust-bag-housing 104 is made of a plurality of paper housing panels 104a wherein the paper panels define a chamber in the dust-bag-housing 104 for containing a dust bag 804.

Furthermore, the vacuum cleaner 100 further comprises a motor housing 102, the dust-bag-housing 104 being secured to the motor housing 102 such that a vacuum motor 304 in the motor housing which is capable of drawing air from the chamber in the dust-bag-housing 104, wherein the motor housing 102 segregates the electrical parts of the vacuum cleaner 100 from the dust-bag-housing 104.

The skilled man understands that 'made of paper' means that structure of the dust-bag-cleaner is based largely on paper, such that the advantages of recycle-ability, eco-friendliness are achieved, ease of manufacture, possibility of user assembly, product light weighted-ness, visual and aesthetic customisability and so on may be significantly, but variedly available. Not all these advantages have to be realized in any single-embodiment. However, this does not discount the possibility that other materials are used with paper, such as reinforcing wood structure, metal or plastic frames.

Variations of the described embodiment include a user-assembly kit for assembling a vacuum cleaner 100, comprising a plurality of paper housing panels 104a, a motor housing 102 containing a vacuum motor 304, an overlaying panel 700, wherein the plurality paper housing panels 104a are capable of being placed in face-wise contact to form a dust-bag-housing 104 such that the edges of the paper housing panels 104a define a chamber in the dust-bag-housing 104 for containing a dust bag 804, the dust-bag-housing 104 is capable of being secured to the motor housing 102 such that the vacuum motor 102 is capable of drawing in air from within the dust-bag-housing 104, the motor housing 102 segregating electrical parts of the vacuum cleaner 100 from the dust-bag-housing, the overlaying panel 700 capable of being overlaid on the edges of the paper housing panels 104a and to be secured to the outermost of the paper housing panels 104a to hold the paper housing panels 104a forming the dust-bag-housing together.

The described embodiment is also a sound-muffled vacuum cleaner comprising a dust-bag-housing made of paper, such the dust-bag-housing is capable of absorbing noise generated when the vacuum cleaner is in operation.

The dust-bag-housing 104 is made of paper is also an embodiment of the invention in another aspect, which can be made and sold separately of the motor housing.

The motor housing 102 is also an embodiment of the invention in another aspect, which can be made and sold separately of the dust-bag-housing 104, the motor housing 102 containing electrical parts required for the operation of the vacuum cleaner 100 to segregate the electrical parts from a dust-bag-housing 104.

While there has been described in the foregoing description preferred embodiments of the present invention, it will be understood by those skilled in the technology concerned that many variations or modifications in details of design, construction or operation may be made without departing from the scope of the present invention as claimed.

For example, in a further variation of the embodiment, the overlaying panel 700 may be replaced by a stretchable piece of rubber band to wrap around the edges of the housing panels 104a. This has the further advantage of the housing panels 104a being pulled in by the constant biasing force of stretched rubber.

In the described embodiment, the plane the housing panels 104a are in an alignment in which they face the sides of the dust-bag-housing 104. However, other embodiments are possible, wherein the housing panels 104a are aligned to face the front and back directions of the main body 100 (not illustrated).

Although cardboard is described, other suitable material such as compressed paper or wood may be used. Furthermore, the skilled man would understand that 'paper' includes all possible types of paper, such as those made of wood pulp, wool or other fibrous material.

The paper housing panels 104a may be secured together in other ways, such as by lacing or skewering the paper panels through with strings or rods, or clips of any design. The ways of mechanically securing the paper housing panels 104a together are varied and is within the knowledge of the skilled person and need no further elaboration here.

In other possible embodiments, clips 704 are not used. Instead, a 'tongue and groove' interlocking system that allows the flaps 710 on the over laying panel 700 to be slipped into a slit (not illustrated) on the side most housing panel 104a is used, provided the flaps and slits are dimensioned to have enough strength to hold all the housing panels 104a together.

Although the embodiment described has an advantage that glue is not used to assemble the paper housing panels 104a together, glue may nevertheless be used in some embodiments. Furthermore, in yet another embodiment of the invention, the dust-bag-housing is a mosaic of compressed paper shreds.

I claim:

1. A vacuum cleaner comprising a dust-bag-housing made of a plurality of housing panels each of the housing panels being made of paper and having a first face, a second face, and edges, the housing panels being arrayed such that the first face of each of the plurality of housing panels is in face-wise contact with one of the first face and the second face of an adjacent one of the plurality of housing panels; wherein
   the housing panels define a chamber in the dust-bag housing for containing a dust bag and further comprising an overlying panel overlaid on the edges of the housing panels and secured to the housing panels to hold the housing panels together.

2. A vacuum cleaner as claimed in claim 1, further comprising:
   a motor housing;
   the dust-bag-housing secured to the motor housing such that a vacuum motor in the motor housing is capable of drawing air from the chamber in the dust-bag-housing; wherein
   electrical parts of the vacuum cleaner which run on electricity are contained in the motor housing to segregate the electrical parts from the dust-bag-housing.

3. A vacuum cleaner as claimed in claim 1, wherein the housing panels are arrayed between outermost housing panels and an overlaying panel is secured to the outermost housing panels to hold the housing panels together.

4. A vacuum cleaner as claimed in claim 3, wherein the overlaying panel forms a cover over the chamber.

5. A vacuum cleaner as claimed in claim 4, wherein the cover is capable of being held in a closed position over the chamber by magnetic devices.

6. A vacuum cleaner as claimed in claim 1, further comprising wheels made at least partly of paper.

7. A vacuum cleaner as claimed in claim 1, wherein the shapes of the housing panels are provided in a downloadable software document to allow a user to cut out the housing panels himself.

8. A vacuum cleaner as claimed in claim 1, wherein each of the plurality of housing panels includes a double walled corrugated cardboard portion.

9. A vacuum cleaner as claimed in claim 8, wherein the double walled corrugated cardboard portion is treated with a flame retardant.

10. A user-assembly kit for assembling a vacuum cleaner, comprising:
- a plurality of housing panels made of paper, each of the housing panels having two faces and edges;
- a motor housing containing a vacuum motor;
- an overlaying panel; wherein the plurality of housing panels is capable of being placed in face-wise contact to form a dust-bag-housing, such that the housing panels define a chamber in the dust-bag-housing for containing a dust bag;
- the dust-bag-housing is capable of being secured to the motor housing such that the vacuum motor is capable of drawing in air from within the dust-bag-housing;
- the motor housing segregates electrical parts of the vacuum cleaner from the dust-bag housing; and
- the overlaying panel is capable of being overlaid on the edges of the housing panels and to be secured to the outermost of the housing panels to hold the housing panels together.

11. A vacuum cleaner assembly kit, as claimed in claim 10, wherein the shapes of the housing panels are provided in a downloadable software document to allow a user to cut out the housing panels himself.

12. A vacuum cleaner comprising:
- a plurality of housing panels each being a substantially planar member having a plurality of edges, the plurality of housing panels stacked in a direction to at least partially define a dust bag housing;
- a chamber formed in the dust bag housing, the chamber formed by the stacked plurality of housing panels;
- a dust bag positioned within the chamber; and
- an overlying panel overlaid on the edges of the housing panels and secured to the housing panels to hold the housing panels together.

13. A vacuum cleaner as claimed in claim 12, wherein each of the plurality of housing panels includes a double walled corrugated cardboard portion.

14. A vacuum cleaner as claimed in claim 13, wherein the double walled corrugated cardboard portion is treated with a flame retardant.

15. A vacuum cleaner as claimed in claim 12, further comprising a cover that selectively covers the chamber and cooperates with the plurality of housing panels to fully enclose the chamber.

16. A vacuum cleaner as claimed in claim 15, wherein the cover is capable of being held in a closed position over the chamber by magnetic devices.

17. A vacuum cleaner as claimed in claim 12, further comprising wheels made at least partly of paper.

18. A vacuum cleaner as claimed in claim 1, wherein the shapes of each of the plurality of housing panels are provided in a downloadable software document to allow a user to cut out the housing panels himself.

* * * * *